(12) United States Patent
Brinlee et al.

(10) Patent No.: US 9,190,898 B2
(45) Date of Patent: Nov. 17, 2015

(54) CONTROLLER FOR A POWER CONVERTER AND METHOD OF OPERATING THE SAME

(75) Inventors: Antony Brinlee, Plano, TX (US); Sriram Chandrasekaran, Dallas, TX (US); Steven Malechek, Murphy, TX (US)

(73) Assignee: Power Systems Technologies, Ltd, Ebene (MU)

( * ) Notice: Subject to any disclaimer, the term of this patent is extended or adjusted under 35 U.S.C. 154(b) by 272 days.

(21) Appl. No.: 13/543,503

(22) Filed: Jul. 6, 2012

(65) Prior Publication Data
US 2014/0009978 A1 Jan. 9, 2014

(51) Int. Cl.
| | |
|---|---|
| *H02M 1/42* | (2007.01) |
| *H02M 3/335* | (2006.01) |
| *H02M 1/00* | (2007.01) |
| *H02M 3/337* | (2006.01) |

(52) U.S. Cl.
CPC ........ *H02M 1/4225* (2013.01); *H02M 3/33569* (2013.01); *H02M 3/337* (2013.01); *H02M 2001/007* (2013.01); *H02M 2001/0025* (2013.01); *H02M 2001/0035* (2013.01); *H02M 2001/0058* (2013.01); *Y02B 70/126* (2013.01); *Y02B 70/1433* (2013.01); *Y02B 70/1491* (2013.01)

(58) Field of Classification Search
CPC ............. H02M 2001/0025; H02M 2001/0035; H02M 2001/007; H02M 1/4225; H02M 3/33507; H02M 3/33569
USPC ........ 323/207, 266; 363/17, 21.01, 21.02, 65, 363/80, 84, 89
See application file for complete search history.

(56) References Cited

U.S. PATENT DOCUMENTS

| | | | |
|---|---|---|---|
| 1,376,978 A | 5/1921 | Stoekle | |
| 2,387,943 A | 10/1945 | Putman | |
| 2,473,662 A | 6/1949 | Pohm | |
| 3,007,060 A | 10/1961 | Guenther | |
| 3,346,798 A | 10/1967 | Dinger | |
| 3,358,210 A | 12/1967 | Grossoehme | |

(Continued)

FOREIGN PATENT DOCUMENTS

| | | |
|---|---|---|
| CN | 2904469 Y | 5/2007 |
| CN | 101106850 A | 1/2008 |

(Continued)

OTHER PUBLICATIONS

"AN100: Application Note using Lx100 Family of High Performance N-Ch JFET Transistors," AN100.Rev 1.01, Sep. 2003, 5 pp., Lovoltech, Inc., Santa Clara, CA.

(Continued)

*Primary Examiner* — Fred E Finch, III
(74) *Attorney, Agent, or Firm* — Boisbrun Hofman, PLLC

(57) ABSTRACT

A controller for a power converter and method of operating the same. In one embodiment, the controller includes an inductor-inductor-capacitor ("LLC") controller configured to receive an error signal from an error amplifier to control a switching frequency of an LLC stage of the power converter to regulate an output voltage thereof. The controller also includes a power factor correction ("PFC") controller configured to control a bus voltage produced by a PFC stage of the power converter and provided to the LLC stage so that an average switching frequency thereof is substantially maintained at a desired switching frequency.

20 Claims, 8 Drawing Sheets

(56) References Cited

U.S. PATENT DOCUMENTS

| | | |
|---|---|---|
| 3,433,998 A | 3/1969 | Woelber |
| 3,484,562 A | 12/1969 | Kronfeld |
| 3,553,620 A | 1/1971 | Cielo et al. |
| 3,622,868 A | 11/1971 | Todt |
| 3,681,679 A | 8/1972 | Chung |
| 3,708,742 A | 1/1973 | Gunn |
| 3,708,744 A | 1/1973 | Stephens et al. |
| 4,011,498 A | 3/1977 | Hamstra |
| 4,019,122 A | 4/1977 | Ryan |
| 4,075,547 A | 2/1978 | Wroblewski |
| 4,202,031 A | 5/1980 | Hesler et al. |
| 4,257,087 A | 3/1981 | Cuk |
| 4,274,071 A | 6/1981 | Pfarre |
| 4,327,348 A | 4/1982 | Hirayama |
| 4,471,423 A | 9/1984 | Hase |
| 4,499,481 A | 2/1985 | Greene |
| 4,570,174 A | 2/1986 | Huang et al. |
| 4,577,268 A | 3/1986 | Easter et al. |
| 4,581,691 A | 4/1986 | Hock |
| 4,613,841 A | 9/1986 | Roberts |
| 4,636,823 A | 1/1987 | Margalit et al. |
| 4,660,136 A | 4/1987 | Montorefano |
| 4,672,245 A | 6/1987 | Majumdar et al. |
| 4,770,667 A | 9/1988 | Evans et al. |
| 4,770,668 A | 9/1988 | Skoultchi et al. |
| 4,780,653 A | 10/1988 | Lee et al. |
| 4,785,387 A | 11/1988 | Lee et al. |
| 4,799,138 A | 1/1989 | Chahabadi et al. |
| 4,803,609 A | 2/1989 | Gillett et al. |
| 4,823,249 A | 4/1989 | Garcia, II |
| 4,837,496 A | 6/1989 | Erdi |
| 4,866,367 A | 9/1989 | Ridley et al. |
| 4,876,638 A | 10/1989 | Silva et al. |
| 4,887,061 A | 12/1989 | Matsumura |
| 4,899,271 A | 2/1990 | Seiersen |
| 4,903,089 A | 2/1990 | Hollis et al. |
| 4,922,400 A | 5/1990 | Cook |
| 4,962,354 A | 10/1990 | Visser et al. |
| 4,964,028 A | 10/1990 | Spataro |
| 4,999,759 A | 3/1991 | Cavagnolo et al. |
| 5,003,277 A | 3/1991 | Sokai et al. |
| 5,014,178 A | 5/1991 | Balakrishnan |
| 5,027,264 A | 6/1991 | DeDoncker et al. |
| 5,055,991 A | 10/1991 | Carroll |
| 5,068,756 A | 11/1991 | Morris et al. |
| 5,106,778 A | 4/1992 | Hollis et al. |
| 5,126,714 A | 6/1992 | Johnson |
| 5,132,888 A | 7/1992 | Lo et al. |
| 5,134,771 A | 8/1992 | Lee et al. |
| 5,172,309 A | 12/1992 | DeDoncker et al. |
| 5,177,460 A | 1/1993 | Dhyanchand et al. |
| 5,182,535 A | 1/1993 | Dhyanchand |
| 5,204,809 A | 4/1993 | Andresen |
| 5,206,621 A | 4/1993 | Yerman |
| 5,208,739 A | 5/1993 | Sturgeon |
| 5,223,449 A | 6/1993 | Morris et al. |
| 5,225,971 A | 7/1993 | Spreen |
| 5,231,037 A | 7/1993 | Yuan et al. |
| 5,244,829 A | 9/1993 | Kim |
| 5,262,930 A | 11/1993 | Hua et al. |
| 5,291,382 A | 3/1994 | Cohen |
| 5,303,138 A | 4/1994 | Rozman |
| 5,305,191 A | 4/1994 | Loftus, Jr. |
| 5,335,163 A | 8/1994 | Seiersen |
| 5,336,985 A | 8/1994 | McKenzie |
| 5,342,795 A | 8/1994 | Yuan et al. |
| 5,343,140 A | 8/1994 | Gegner |
| 5,353,001 A | 10/1994 | Meinel et al. |
| 5,369,042 A | 11/1994 | Morris et al. |
| 5,374,887 A | 12/1994 | Drobnik |
| 5,399,968 A | 3/1995 | Sheppard et al. |
| 5,407,842 A | 4/1995 | Morris et al. |
| 5,453,923 A | 9/1995 | Scalais et al. |
| 5,459,652 A | 10/1995 | Faulk |
| 5,468,661 A | 11/1995 | Yuan et al. |
| 5,477,175 A | 12/1995 | Tisinger et al. |
| 5,508,903 A | 4/1996 | Alexndrov |
| 5,523,673 A | 6/1996 | Ratliff et al. |
| 5,539,630 A | 7/1996 | Pietkiewicz et al. |
| 5,554,561 A | 9/1996 | Plumton |
| 5,555,494 A | 9/1996 | Morris |
| 5,581,224 A | 12/1996 | Yamaguchi |
| 5,610,085 A | 3/1997 | Yuan et al. |
| 5,624,860 A | 4/1997 | Plumton et al. |
| 5,636,116 A | 6/1997 | Milavec et al. |
| 5,661,642 A | 8/1997 | Shimashita |
| 5,663,876 A | 9/1997 | Newton et al. |
| 5,671,131 A | 9/1997 | Brown |
| 5,700,703 A | 12/1997 | Huang et al. |
| 5,712,189 A | 1/1998 | Plumton et al. |
| 5,719,544 A | 2/1998 | Vinciarelli et al. |
| 5,734,564 A | 3/1998 | Brkovic |
| 5,736,842 A | 4/1998 | Jovanovic |
| 5,742,491 A | 4/1998 | Bowman et al. |
| 5,747,842 A | 5/1998 | Plumton |
| 5,756,375 A | 5/1998 | Celii et al. |
| 5,760,671 A | 6/1998 | Lahr et al. |
| 5,783,984 A | 7/1998 | Keuneke |
| 5,784,266 A | 7/1998 | Chen |
| 5,804,943 A | 9/1998 | Kollman et al. |
| 5,815,386 A | 9/1998 | Gordon |
| 5,864,110 A | 1/1999 | Moriguchi et al. |
| 5,870,296 A | 2/1999 | Schaffer |
| 5,870,299 A | 2/1999 | Rozman |
| 5,886,508 A | 3/1999 | Jutras |
| 5,889,298 A | 3/1999 | Plumton et al. |
| 5,889,660 A | 3/1999 | Taranowski et al. |
| 5,900,822 A | 5/1999 | Sand et al. |
| 5,907,481 A | 5/1999 | Svardsjo |
| 5,909,110 A | 6/1999 | Yuan et al. |
| 5,910,665 A | 6/1999 | Plumton et al. |
| 5,920,475 A | 7/1999 | Boylan et al. |
| 5,929,665 A | 7/1999 | Ichikawa et al. |
| 5,933,338 A | 8/1999 | Wallace |
| 5,940,287 A | 8/1999 | Brkovic |
| 5,946,207 A | 8/1999 | Schoofs |
| 5,956,245 A | 9/1999 | Rozman |
| 5,956,578 A | 9/1999 | Weitzel et al. |
| 5,959,850 A | 9/1999 | Lim |
| 5,977,853 A | 11/1999 | Ooi et al. |
| 5,982,640 A | 11/1999 | Naveed |
| 5,999,066 A | 12/1999 | Saito et al. |
| 5,999,429 A | 12/1999 | Brown |
| 6,003,139 A | 12/1999 | McKenzie |
| 6,008,519 A | 12/1999 | Yuan et al. |
| 6,011,703 A | 1/2000 | Boylan et al. |
| 6,038,154 A | 3/2000 | Boylan et al. |
| 6,046,664 A | 4/2000 | Weller et al. |
| 6,060,943 A | 5/2000 | Jansen |
| 6,067,237 A | 5/2000 | Nguyen |
| 6,069,798 A | 5/2000 | Liu |
| 6,069,799 A | 5/2000 | Bowman et al. |
| 6,078,510 A | 6/2000 | Spampinato et al. |
| 6,084,792 A | 7/2000 | Chen et al. |
| 6,094,038 A | 7/2000 | Lethellier |
| 6,097,046 A | 8/2000 | Plumton |
| 6,125,046 A | 9/2000 | Jang et al. |
| 6,144,187 A | 11/2000 | Bryson |
| 6,147,886 A | 11/2000 | Wittenbreder |
| 6,156,611 A | 12/2000 | Lan et al. |
| 6,160,374 A | 12/2000 | Hayes et al. |
| 6,160,721 A | 12/2000 | Kossives et al. |
| 6,163,466 A | 12/2000 | Davila, Jr. et al. |
| 6,181,231 B1 | 1/2001 | Bartilson |
| 6,188,586 B1 | 2/2001 | Farrington et al. |
| 6,191,964 B1 | 2/2001 | Boylan et al. |
| 6,208,535 B1 | 3/2001 | Parks |
| 6,212,084 B1 | 4/2001 | Turner |
| 6,215,290 B1 | 4/2001 | Yang et al. |
| 6,218,891 B1 | 4/2001 | Lotfi et al. |
| 6,229,197 B1 | 5/2001 | Plumton et al. |
| 6,262,564 B1 | 7/2001 | Kanamori |
| 6,288,501 B1 | 9/2001 | Nakamura et al. |
| 6,288,920 B1 | 9/2001 | Jacobs et al. |

(56) References Cited

U.S. PATENT DOCUMENTS

| | | |
|---|---|---|
| 6,295,217 B1 | 9/2001 | Yang et al. |
| 6,304,460 B1 | 10/2001 | Cuk |
| 6,309,918 B1 | 10/2001 | Huang et al. |
| 6,317,021 B1 | 11/2001 | Jansen |
| 6,317,337 B1 | 11/2001 | Yasumura |
| 6,320,490 B1 | 11/2001 | Clayton |
| 6,323,090 B1 | 11/2001 | Zommer |
| 6,325,035 B1 | 12/2001 | Codina et al. |
| 6,344,986 B1 | 2/2002 | Jain et al. |
| 6,348,848 B1 | 2/2002 | Herbert |
| 6,351,396 B1 | 2/2002 | Jacobs |
| 6,356,462 B1 | 3/2002 | Jang et al. |
| 6,362,986 B1 | 3/2002 | Schultz et al. |
| 6,373,727 B1 | 4/2002 | Hedenskog et al. |
| 6,373,734 B1 | 4/2002 | Martinelli |
| 6,380,836 B2 | 4/2002 | Matsumoto et al. |
| 6,388,898 B1 | 5/2002 | Fan et al. |
| 6,392,902 B1 | 5/2002 | Jang et al. |
| 6,396,718 B1 | 5/2002 | Ng et al. |
| 6,400,579 B2 | 6/2002 | Cuk |
| 6,414,578 B1 | 7/2002 | Jitaru |
| 6,418,039 B2 | 7/2002 | Lentini et al. |
| 6,438,009 B2 | 8/2002 | Assow |
| 6,445,598 B1 | 9/2002 | Yamada |
| 6,462,965 B1 | 10/2002 | Uesono |
| 6,466,461 B2 | 10/2002 | Mao et al. |
| 6,469,564 B1 | 10/2002 | Jansen |
| 6,477,065 B2 | 11/2002 | Parks |
| 6,483,724 B1 | 11/2002 | Blair et al. |
| 6,489,754 B2 | 12/2002 | Blom |
| 6,498,367 B1 | 12/2002 | Chang et al. |
| 6,501,193 B1 | 12/2002 | Krugly |
| 6,504,321 B2 | 1/2003 | Giannopoulos et al. |
| 6,512,352 B2 | 1/2003 | Qian |
| 6,525,603 B1 | 2/2003 | Morgan |
| 6,539,299 B2 | 3/2003 | Chatfield et al. |
| 6,545,453 B2 | 4/2003 | Glinkowski et al. |
| 6,548,992 B1 | 4/2003 | Alcantar et al. |
| 6,549,436 B1 | 4/2003 | Sun |
| 6,552,917 B1 | 4/2003 | Bourdillon |
| 6,559,689 B1 | 5/2003 | Clark |
| 6,563,725 B2 | 5/2003 | Carsten |
| 6,570,268 B1 | 5/2003 | Perry et al. |
| 6,580,627 B2 | 6/2003 | Toshio |
| 6,597,588 B2 | 7/2003 | Matsumoto |
| 6,608,768 B2 | 8/2003 | Sula |
| 6,611,132 B2 | 8/2003 | Nakagawa et al. |
| 6,614,206 B1 | 9/2003 | Wong et al. |
| 6,636,025 B1 * | 10/2003 | Irissou ........................ 323/313 |
| 6,654,259 B2 | 11/2003 | Koshita et al. |
| 6,661,276 B1 | 12/2003 | Chang |
| 6,668,296 B1 | 12/2003 | Dougherty et al. |
| 6,674,658 B2 | 1/2004 | Mao et al. |
| 6,683,797 B2 | 1/2004 | Zaitsu et al. |
| 6,687,137 B1 | 2/2004 | Yasumura |
| 6,696,910 B2 | 2/2004 | Nuytkens et al. |
| 6,731,486 B2 | 5/2004 | Holt et al. |
| 6,741,099 B1 | 5/2004 | Krugly |
| 6,751,106 B2 | 6/2004 | Zhang et al. |
| 6,753,723 B2 | 6/2004 | Zhang |
| 6,765,810 B2 | 7/2004 | Perry |
| 6,775,159 B2 | 8/2004 | Webb et al. |
| 6,784,644 B2 | 8/2004 | Xu et al. |
| 6,804,125 B2 | 10/2004 | Brkovic |
| 6,813,170 B2 | 11/2004 | Yang |
| 6,831,847 B2 | 12/2004 | Perry |
| 6,839,247 B1 | 1/2005 | Yang |
| 6,856,149 B2 | 2/2005 | Yang |
| 6,862,194 B2 | 3/2005 | Yang et al. |
| 6,867,678 B2 | 3/2005 | Yang |
| 6,867,986 B2 | 3/2005 | Amei |
| 6,873,237 B2 | 3/2005 | Chandrasekaran et al. |
| 6,882,548 B1 | 4/2005 | Jacobs et al. |
| 6,906,934 B2 | 6/2005 | Yang et al. |
| 6,943,553 B2 | 9/2005 | Zimmerman |
| 6,944,033 B1 | 9/2005 | Xu et al. |
| 6,977,824 B1 | 12/2005 | Yang et al. |
| 6,980,077 B1 | 12/2005 | Chandrasekaran et al. |
| 6,982,887 B2 | 1/2006 | Batarseh et al. |
| 7,009,486 B1 | 3/2006 | Goeke et al. |
| 7,012,414 B1 | 3/2006 | Mehrotra et al. |
| 7,016,204 B2 | 3/2006 | Yang et al. |
| 7,023,679 B2 | 4/2006 | Tomiyama |
| 7,026,807 B2 | 4/2006 | Anderson et al. |
| 7,034,586 B2 | 4/2006 | Mehas et al. |
| 7,034,647 B2 | 4/2006 | Yan et al. |
| 7,046,523 B2 | 5/2006 | Sun et al. |
| 7,061,358 B1 | 6/2006 | Yang |
| 7,072,189 B2 | 7/2006 | Kim et al. |
| 7,075,799 B2 | 7/2006 | Qu |
| 7,076,360 B1 | 7/2006 | Ma |
| 7,095,638 B2 | 8/2006 | Uusitalo |
| 7,099,163 B1 | 8/2006 | Ying |
| 7,136,293 B2 | 11/2006 | Petkov et al. |
| 7,148,669 B2 | 12/2006 | Maksimovic et al. |
| 7,170,268 B2 | 1/2007 | Kim |
| 7,176,662 B2 | 2/2007 | Chandrasekaran |
| 7,209,024 B2 | 4/2007 | Nakahori |
| 7,269,038 B2 | 9/2007 | Shekhawat et al. |
| 7,280,026 B2 | 10/2007 | Chandrasekaran et al. |
| 7,285,807 B2 | 10/2007 | Brar et al. |
| 7,298,118 B2 | 11/2007 | Chandrasekaran |
| 7,301,785 B2 | 11/2007 | Yasumura |
| 7,312,686 B2 | 12/2007 | Bruno |
| 7,321,283 B2 | 1/2008 | Mehrotra et al. |
| 7,332,992 B2 | 2/2008 | Iwai |
| 7,339,208 B2 | 3/2008 | Brar et al. |
| 7,339,801 B2 | 3/2008 | Yasumura |
| 7,348,612 B2 | 3/2008 | Sriram et al. |
| 7,362,592 B2 | 4/2008 | Yang et al. |
| 7,362,593 B2 | 4/2008 | Yang et al. |
| 7,375,607 B2 | 5/2008 | Lee et al. |
| 7,375,994 B2 * | 5/2008 | Andreycak ........................ 363/89 |
| 7,385,375 B2 | 6/2008 | Rozman |
| 7,386,404 B2 | 6/2008 | Cargonja et al. |
| 7,393,247 B1 | 7/2008 | Yu et al. |
| 7,417,875 B2 | 8/2008 | Chandrasekaran et al. |
| 7,427,910 B2 | 9/2008 | Mehrotra et al. |
| 7,431,862 B2 | 10/2008 | Mehrotra et al. |
| 7,439,556 B2 | 10/2008 | Brar et al. |
| 7,439,557 B2 | 10/2008 | Brar et al. |
| 7,446,512 B2 | 11/2008 | Nishihara et al. |
| 7,447,049 B2 | 11/2008 | Garner et al. |
| 7,453,709 B2 | 11/2008 | Park et al. |
| 7,462,891 B2 | 12/2008 | Brar et al. |
| 7,468,649 B2 | 12/2008 | Chandrasekaran |
| 7,471,523 B2 | 12/2008 | Yang |
| 7,471,527 B2 | 12/2008 | Chen |
| 7,489,225 B2 | 2/2009 | Dadafshar |
| 7,499,295 B2 | 3/2009 | Indika de Silva et al. |
| 7,541,640 B2 | 6/2009 | Brar et al. |
| 7,554,430 B2 | 6/2009 | Mehrotra et al. |
| 7,558,082 B2 | 7/2009 | Jitaru |
| 7,567,445 B2 | 7/2009 | Coulson et al. |
| 7,583,555 B2 | 9/2009 | Kang et al. |
| 7,626,370 B1 | 12/2009 | Mei et al. |
| 7,630,219 B2 | 12/2009 | Lee |
| 7,633,369 B2 | 12/2009 | Chandrasekaran et al. |
| 7,663,183 B2 | 2/2010 | Brar et al. |
| 7,667,986 B2 | 2/2010 | Artusi et al. |
| 7,675,758 B2 | 3/2010 | Artusi et al. |
| 7,675,759 B2 | 3/2010 | Artusi et al. |
| 7,675,764 B2 | 3/2010 | Chandrasekaran et al. |
| 7,715,217 B2 | 5/2010 | Manabe et al. |
| 7,733,679 B2 | 6/2010 | Luger et al. |
| 7,746,041 B2 | 6/2010 | Xu et al. |
| 7,778,050 B2 | 8/2010 | Yamashita |
| 7,778,051 B2 | 8/2010 | Yang |
| 7,787,264 B2 | 8/2010 | Yang et al. |
| 7,791,903 B2 | 9/2010 | Zhang et al. |
| 7,795,849 B2 | 9/2010 | Sohma |
| 7,813,101 B2 | 10/2010 | Morikawa |
| 7,847,535 B2 | 12/2010 | Meynard et al. |
| 7,876,191 B2 | 1/2011 | Chandrasekaran et al. |

(56) References Cited

U.S. PATENT DOCUMENTS

| | | |
|---|---|---|
| 7,889,517 B2 | 2/2011 | Artusi et al. |
| 7,889,521 B2 | 2/2011 | Hsu |
| 7,906,941 B2 | 3/2011 | Jayaraman et al. |
| 7,940,035 B2 | 5/2011 | Yang |
| 7,965,528 B2 | 6/2011 | Yang et al. |
| 7,983,063 B2 | 7/2011 | Lu et al. |
| 8,004,112 B2 | 8/2011 | Koga et al. |
| 8,125,205 B2 | 2/2012 | Chandrasekaran et al. |
| 8,134,443 B2 | 3/2012 | Chandrasekaran et al. |
| 8,179,699 B2 | 5/2012 | Tumminaro et al. |
| 8,184,456 B1 * | 5/2012 | Jain et al. .................. 363/21.02 |
| 8,278,889 B2 | 10/2012 | Tataeishi |
| 8,467,199 B2 * | 6/2013 | Lee et al. .................. 363/21.02 |
| 8,488,355 B2 | 7/2013 | Berghegger |
| 8,520,414 B2 | 8/2013 | Garrity et al. |
| 8,520,420 B2 | 8/2013 | Jungreis et al. |
| 8,638,578 B2 | 1/2014 | Zhang |
| 8,643,222 B2 | 2/2014 | Brinlee et al. |
| 8,767,418 B2 | 7/2014 | Jungreis et al. |
| 8,787,043 B2 | 7/2014 | Berghegger |
| 8,976,549 B2 | 3/2015 | Berghegger |
| 2001/0020886 A1 | 9/2001 | Matsumoto et al. |
| 2001/0024373 A1 | 9/2001 | Cuk |
| 2002/0057080 A1 | 5/2002 | Telefus et al. |
| 2002/0101741 A1 | 8/2002 | Brkovic |
| 2002/0110005 A1 | 8/2002 | Mao et al. |
| 2002/0114172 A1 | 8/2002 | Webb et al. |
| 2002/0145888 A1 | 10/2002 | Yoshinaga et al. |
| 2002/0167385 A1 | 11/2002 | Ackermann |
| 2003/0026115 A1 | 2/2003 | Miyazaki |
| 2003/0030422 A1 | 2/2003 | Sula |
| 2003/0039129 A1 | 2/2003 | Miyazaki et al. |
| 2003/0063483 A1 | 4/2003 | Carsten |
| 2003/0063484 A1 | 4/2003 | Carsten |
| 2003/0076079 A1 | 4/2003 | Alcantar et al. |
| 2003/0086279 A1 | 5/2003 | Bourdillon |
| 2003/0197585 A1 | 10/2003 | Chandrasekaran et al. |
| 2003/0198067 A1 | 10/2003 | Sun et al. |
| 2004/0032754 A1 | 2/2004 | Yang |
| 2004/0034555 A1 | 2/2004 | Dismukes et al. |
| 2004/0064621 A1 | 4/2004 | Dougherty et al. |
| 2004/0148047 A1 | 7/2004 | Dismukes et al. |
| 2004/0156220 A1 | 8/2004 | Kim et al. |
| 2004/0174147 A1 * | 9/2004 | Vinciarelli .................. 323/266 |
| 2004/0196672 A1 | 10/2004 | Amei |
| 2004/0200631 A1 | 10/2004 | Chen |
| 2004/0217794 A1 | 11/2004 | Strysko |
| 2004/0257095 A1 | 12/2004 | Yang |
| 2005/0024179 A1 | 2/2005 | Chandrasekaran et al. |
| 2005/0046404 A1 | 3/2005 | Uusitalo |
| 2005/0052224 A1 | 3/2005 | Yang et al. |
| 2005/0052886 A1 | 3/2005 | Yang et al. |
| 2005/0245658 A1 | 11/2005 | Mehrotra et al. |
| 2005/0254266 A1 | 11/2005 | Jitaru |
| 2005/0254268 A1 | 11/2005 | Reinhard et al. |
| 2005/0281058 A1 | 12/2005 | Batarseh et al. |
| 2005/0286270 A1 | 12/2005 | Petkov et al. |
| 2006/0006975 A1 | 1/2006 | Jitaru et al. |
| 2006/0006976 A1 | 1/2006 | Bruno |
| 2006/0007713 A1 | 1/2006 | Brown |
| 2006/0018136 A1 | 1/2006 | Takahashi |
| 2006/0038549 A1 | 2/2006 | Mehrotra et al. |
| 2006/0038649 A1 | 2/2006 | Mehrotra et al. |
| 2006/0038650 A1 | 2/2006 | Mehrotra et al. |
| 2006/0091430 A1 | 5/2006 | Sriram et al. |
| 2006/0109698 A1 | 5/2006 | Qu |
| 2006/0187684 A1 | 8/2006 | Chandrasekaran et al. |
| 2006/0197510 A1 | 9/2006 | Chandrasekaran |
| 2006/0198173 A1 | 9/2006 | Rozman |
| 2006/0226477 A1 | 10/2006 | Brar et al. |
| 2006/0226478 A1 | 10/2006 | Brar et al. |
| 2006/0227576 A1 | 10/2006 | Yasumura |
| 2006/0237968 A1 | 10/2006 | Chandrasekaran |
| 2006/0255360 A1 | 11/2006 | Brar et al. |
| 2006/0271315 A1 | 11/2006 | Cargonja et al. |
| 2006/0286865 A1 | 12/2006 | Chou et al. |
| 2007/0007945 A1 | 1/2007 | King et al. |
| 2007/0010298 A1 | 1/2007 | Chang |
| 2007/0019356 A1 | 1/2007 | Morikawa |
| 2007/0025124 A1 | 2/2007 | Hansson |
| 2007/0030717 A1 | 2/2007 | Luger et al. |
| 2007/0041224 A1 | 2/2007 | Moyse et al. |
| 2007/0045765 A1 | 3/2007 | Brar et al. |
| 2007/0058402 A1 | 3/2007 | Shekhawat et al. |
| 2007/0069286 A1 | 3/2007 | Brar et al. |
| 2007/0114979 A1 | 5/2007 | Chandrasekaran |
| 2007/0120953 A1 | 5/2007 | Koga et al. |
| 2007/0121351 A1 | 5/2007 | Zhang et al. |
| 2007/0139984 A1 * | 6/2007 | Lo .................. 363/89 |
| 2007/0159857 A1 | 7/2007 | Lee |
| 2007/0206523 A1 | 9/2007 | Huynh et al. |
| 2007/0222463 A1 | 9/2007 | Qahouq et al. |
| 2007/0241721 A1 | 10/2007 | Weinstein et al. |
| 2007/0274106 A1 | 11/2007 | Weinstein et al. |
| 2007/0274107 A1 | 11/2007 | Garner et al. |
| 2007/0296028 A1 | 12/2007 | Brar et al. |
| 2007/0296383 A1 | 12/2007 | Xu |
| 2007/0298559 A1 | 12/2007 | Brar et al. |
| 2007/0298564 A1 | 12/2007 | Brar et al. |
| 2008/0012423 A1 | 1/2008 | Mimran |
| 2008/0012802 A1 | 1/2008 | Lin |
| 2008/0024094 A1 | 1/2008 | Nishihara et al. |
| 2008/0024259 A1 | 1/2008 | Chandrasekaran et al. |
| 2008/0030178 A1 * | 2/2008 | Leonard et al. .................. 323/282 |
| 2008/0031021 A1 | 2/2008 | Ros et al. |
| 2008/0037294 A1 | 2/2008 | Indika de Silva et al. |
| 2008/0054874 A1 | 3/2008 | Chandrasekaran et al. |
| 2008/0061746 A1 | 3/2008 | Kobayashi et al. |
| 2008/0080219 A1 | 4/2008 | Sohma |
| 2008/0111657 A1 | 5/2008 | Mehrotra et al. |
| 2008/0130321 A1 | 6/2008 | Artusi et al. |
| 2008/0130322 A1 | 6/2008 | Artusi et al. |
| 2008/0137381 A1 | 6/2008 | Beasley |
| 2008/0150666 A1 | 6/2008 | Chandrasekaran et al. |
| 2008/0175026 A1 | 7/2008 | Yang |
| 2008/0198638 A1 * | 8/2008 | Reinberger et al. ............. 363/74 |
| 2008/0205104 A1 | 8/2008 | Lev et al. |
| 2008/0224812 A1 | 9/2008 | Chandrasekaran |
| 2008/0232141 A1 | 9/2008 | Artusi et al. |
| 2008/0298106 A1 | 12/2008 | Tateishi |
| 2008/0310190 A1 | 12/2008 | Chandrasekaran et al. |
| 2008/0315852 A1 | 12/2008 | Jayaraman et al. |
| 2008/0316779 A1 | 12/2008 | Jayaraman et al. |
| 2009/0002054 A1 | 1/2009 | Tsunoda et al. |
| 2009/0027926 A1 | 1/2009 | Yang et al. |
| 2009/0037768 A1 | 2/2009 | Adams |
| 2009/0046486 A1 | 2/2009 | Lu et al. |
| 2009/0072626 A1 * | 3/2009 | Watanabe et al. ............. 307/85 |
| 2009/0097290 A1 | 4/2009 | Chandrasekaran |
| 2009/0109711 A1 | 4/2009 | Hsu |
| 2009/0257250 A1 | 10/2009 | Liu |
| 2009/0273957 A1 | 11/2009 | Feldtkeller |
| 2009/0284994 A1 | 11/2009 | Lin et al. |
| 2009/0289557 A1 | 11/2009 | Itoh et al. |
| 2009/0290385 A1 | 11/2009 | Jungreis et al. |
| 2009/0310388 A1 | 12/2009 | Yang |
| 2009/0315530 A1 | 12/2009 | Baranwal |
| 2010/0020578 A1 * | 1/2010 | Ryu et al. .................. 363/68 |
| 2010/0054000 A1 * | 3/2010 | Huynh .................. 363/21.16 |
| 2010/0066336 A1 | 3/2010 | Araki et al. |
| 2010/0091522 A1 | 4/2010 | Chandrasekaran et al. |
| 2010/0123486 A1 | 5/2010 | Berghegger |
| 2010/0149838 A1 | 6/2010 | Artusi et al. |
| 2010/0164400 A1 * | 7/2010 | Adragna .................. 315/294 |
| 2010/0164443 A1 | 7/2010 | Tumminaro et al. |
| 2010/0182806 A1 | 7/2010 | Garrity et al. |
| 2010/0188876 A1 | 7/2010 | Garrity et al. |
| 2010/0202165 A1 | 8/2010 | Zheng et al. |
| 2010/0213989 A1 | 8/2010 | Nakatake |
| 2010/0219802 A1 | 9/2010 | Lin et al. |
| 2010/0254168 A1 | 10/2010 | Chandrasekaran |
| 2010/0321958 A1 | 12/2010 | Brinlee et al. |
| 2010/0321964 A1 | 12/2010 | Brinlee et al. |
| 2011/0025289 A1 * | 2/2011 | Wang et al. .................. 323/285 |

(56) References Cited

U.S. PATENT DOCUMENTS

| | | | |
|---|---|---|---|
| 2011/0038179 A1 | 2/2011 | Zhang | |
| 2011/0062926 A1 | 3/2011 | Qiu et al. | |
| 2011/0080102 A1* | 4/2011 | Ge et al. | 315/200 R |
| 2011/0089917 A1 | 4/2011 | Chen et al. | |
| 2011/0095730 A1 | 4/2011 | Strijker et al. | |
| 2011/0134664 A1 | 6/2011 | Berghegger | |
| 2011/0149607 A1 | 6/2011 | Jungreis et al. | |
| 2011/0157936 A1 | 6/2011 | Huynh | |
| 2011/0182089 A1 | 7/2011 | Berghegger | |
| 2011/0239008 A1 | 9/2011 | Lam et al. | |
| 2011/0241738 A1 | 10/2011 | Tamaoka | |
| 2011/0267856 A1 | 11/2011 | Pansier | |
| 2011/0291591 A1 | 12/2011 | Shiu et al. | |
| 2011/0305047 A1 | 12/2011 | Jungreis et al. | |
| 2012/0020119 A1 | 1/2012 | Tang et al. | |
| 2012/0243271 A1 | 9/2012 | Berghegger | |
| 2012/0250378 A1 | 10/2012 | Kok et al. | |
| 2012/0294048 A1 | 11/2012 | Brinlee | |
| 2013/0003430 A1* | 1/2013 | Reddy | 363/74 |
| 2013/0134894 A1 | 5/2013 | Kuang | |
| 2013/0229829 A1 | 9/2013 | Zhang et al. | |
| 2013/0250627 A1 | 9/2013 | Herfurth | |
| 2014/0091718 A1 | 4/2014 | Brinlee | |
| 2014/0091720 A1* | 4/2014 | Brinlee | 315/186 |
| 2014/0254215 A1 | 9/2014 | Brinlee et al. | |
| 2014/0301111 A1 | 10/2014 | Jungreis et al. | |
| 2015/0098254 A1 | 4/2015 | Brinlee et al. | |
| 2015/0138857 A1 | 5/2015 | Ye et al. | |

FOREIGN PATENT DOCUMENTS

| | | |
|---|---|---|
| CN | 101123395 A | 2/2008 |
| CN | 101141099 | 3/2008 |
| CN | 101202509 | 6/2008 |
| CN | 201252294 | 6/2009 |
| CN | 101834541 A | 9/2010 |
| CN | 102412727 A | 4/2012 |
| CN | 102695325 A | 9/2012 |
| CN | 101489335 B | 12/2012 |
| DE | 10112820 A1 | 10/2002 |
| DE | 10310361 | 9/2004 |
| DE | 10352509 A1 | 6/2005 |
| DE | 102103104899 A1 | 11/2014 |
| EP | 0665634 | 1/1994 |
| JP | 57097361 | 6/1982 |
| JP | 3215911 | 9/1991 |
| JP | 200068132 | 3/2000 |
| JP | 2008283818 A * | 11/2008 |
| WO | WO8700991 | 2/1987 |
| WO | 03088463 A1 | 10/2003 |
| WO | WO2010083511 | 7/2010 |
| WO | WO2010083514 | 7/2010 |
| WO | WO2010114914 | 10/2010 |
| WO | WO2011116225 | 9/2011 |

OTHER PUBLICATIONS

"AN101A: Gate Drive Network for a Power JFET," AN101A.Rev 1.2, Nov. 2003, 2 pp., Lovoltech, Inc., Santa Clara, CA.
"AN108: Applications Note: How to Use Power JFETs® and MOSFETs Interchangeably in Low-Side Applications," Rev. 1.0.1, Feb. 14, 2005, 4 pp., Lovoltech, Inc., Santa Clara, CA.
Ajram, S., et al., "Ultrahigh Frequency DC-to-DC Converters Using GaAs Power Switches," IEEE Transactions on Power Electronics, Sep. 2001, pp. 594-602, vol. 16, No. 5, IEEE, Los Alamitos, CA.
Balogh, L., et al., "Power-Factor Correction with Interleaved Boost Converters in Continuous-Inductor-Current Mode," IEEE Proceedings of APEC, pp. 168-174, 1993, IEEE, Los Alamitos, CA.
Biernacki, J., et al., "Radio Frequency DC-DC Flyback Converter," Proceedings of the 43rd IEEE Midwest Symposium on Circuits and Systems, Aug. 8-11, 2000, pp. 94-97, vol. 1, IEEE, Los Alamitos, CA.
Chen, W., et al., "Design of High Efficiency, Low Profile, Low Voltage Converter with Integrated Magnetics," Proceedings of 1997 IEEE Applied Power Electronics Conference (APEC '97), 1997, pp. 911-917, IEEE, Los Alamitos, CA.
Chen, W., et al., "Integrated Planar Inductor Scheme for Multi-module Interleaved Quasi-Square-Wave (QSW) DC/DC Converter," 30th Annual IEEE Power Electronics Specialists Conference (PESC '99), 1999, pp. 759-762, vol. 2, IEEE, Los Alamitos, CA.
Chhawchharia, P., et al., "On the Reduction of Component Count in Switched Capacitor DC/DC Convertors," Hong Kong Polytechnic University, IEEE, 1997, Hung Hom, Kowloon, Hong King, pp. 1395-1401.
Curtis, K., "Advances in Microcontroller Peripherals Facilitate Current-Mode for Digital Power Supplies," Digital Power Forum '06, 4 pp., Sep. 2006, Darnell Group, Richardson, TX.
Eisenbeiser, K., et al., "Manufacturable GaAs VFET for Power Switching Applications," IEEE Electron Device Letters, Apr. 2000, pp. 144-145, vol. 21, No. 4, IEEE.
Freescale Semiconductor, "Implementing a Digital AC/DC Switched-Mode Power Supply using a 56F8300 Digital Signal Controller," Application Note AN3115, Aug. 2005, 24 pp., Chandler, AZ.
Freescale Semiconductor, "56F8323 Evaluation Module User Manual, 56F8300 16-bit Digital Signal Controllers", MC56F8323EVMUM, Rev. 2, Jul. 2005 (72 pages).
Freescale Semiconductor, "56F8323/56F8123 Data Sheet Preliminary Technical Data, 56F8300 16-bit Digital Signal Controllers," MC56F8323 Rev. 17, Apr. 2007 (140 pages).
Freescale Semiconductor, "Design of a Digital Ac/Dc SMPS using the 56F8323 Device, Designer Reference Manual, 56800E 16-bit Digital Signal Controllers", DRM074, Rev. 0, Aug. 2005 (108 pages).
Gaye, M., et al., "A 50-100MHz 5V to -5V, 1W Cuk Converter Using Gallium Arsenide Power Switches," ISCAS 2000—IEEE International Symposium on Circuits and Systems, May 28-31, 2000, pp. I-264-I-267, vol. 1, IEEE, Geneva, Switzerland.
Goldberg, A.F., et al., "Finite-Element Analysis of Copper Loss in 1-10-MHz Transformers," IEEE Transactions on Power Electronics, Apr. 1989, pp. 157-167, vol. 4, No. 2, IEEE, Los Alamitos, CA.
Goldberg, A.F., et al., "Issues Related to 1-10-MHz Transformer Design," IEEE Transactions on Power Electronics, Jan. 1989, pp. 113-123, vol. 4, No. 1, IEEE, Los Alamitos, CA.
Jitaru, I.D., et al., "Quasi-Integrated Magnetic an Avenue for Higher Power Density and Efficiency in Power Converters," 12th Annual Applied Power Electronics Conference and Exposition, Feb. 23-27, 1997, pp. 395-402, vol. 1, IEEE, Los Alamitos, CA.
Kollman, R., et al., "10 MHz PWM Converters with GaAs VFETs," IEEE 11th Annual Applied Power Electronics Conference and Exposition, Mar. 1996, pp. 264-269, vol. 1, IEEE.
Kuwabara, K., et al., "Switched-Capacitor DC—DC Converters," Fujitsu Limited, IEEE, 1988, Kawasaki, Japan, pp. 213-218.
Lee, P.-W., et al., "Steady-State Analysis of an Interleaved Boost Converter with Coupled Inductors," IEEE Transactions on Industrial Electronics, Aug. 2000, pp. 787-795, vol. 47, No. 4, IEEE, Los Alamitos, CA.
Lenk, R., "Introduction to the Tapped Buck Converter," PCIM 2000, HFPC 2000 Proceedings, Oct. 2000, pp. 155-166.
Liu, W., "Fundamentals of III-V Devices: HBTs, MESFETs, and FIFETs/HEMTs," §5-5: Modulation Doping, 1999, pp. 323-330, John Wiley & Sons, New York, NY.
Maksimovic, D., et al., "Switching Converters with Wide DC Conversion Range," IEEE Transactions on Power Electronics, Jan. 1991, pp. 151-157, vol. 6, No. 1, IEEE, Los Alamitos, CA.
Maxim, Application Note 725, www.maxim-ic.com/an725, Maxim Integrated Products, Nov. 29, 2001, 8 pages.
Middlebrook, R.D., "Transformerless DC-to-DC Converters with Large Conversion Ratios," IEEE Transactions on Power Electronics, Oct. 1988, pp. 484-488, vol. 3, No. 4, IEEE, Los Alamitos, CA.
Miwa, B.A., et al., "High Efficiency Power Factor Correction Using Interleaving Techniques," IEEE Proceedings of APEC, 1992, pp. 557-568, IEEE, Los Alamitos, CA.
National Semiconductor Corporation, "LM2665 Switched Capacitor Voltage Converter," www.national.com, Sep. 2005, 9 pages.
National Semiconductor Corporation, "LMC7660 Switched Capacitor Voltage Converter," www.national.com, Apr. 1997, 12 pages.

(56) References Cited

OTHER PUBLICATIONS

Nguyen, L.D., et al., "Ultra-High-Speed Modulation-Doped Field-Effect Transistors: A Tutorial Review," Proceedings of the IEEE, Apr. 1992, pp. 494-518, vol. 80, No. 4, IEEE.

Niemela, V.A., et al., "Comparison of GaAs and Silicon Synchronous Rectifiers in a 3.3V Out, 50W DC-DC Converter," 27th Annual IEEE Power Electronics Specialists Conference, Jun. 1996, pp. 861-867, vol. 1, IEEE.

Ninomiya, T., et al., "Static and Dynamic Analysis of Zero-Voltage-Switched Half-Bridge Converter with PWM Control," Proceedings of 1991 IEEE Power Electronics Specialists Conference (PESC '91), 1991, pp. 230-237, IEEE, Los Alamitos, CA.

O'Meara, K., "A New Output Rectifier Configuration Optimized for High Frequency Operation," Proceedings of 1991 High Frequency Power Conversion (HFPC '91) Conference, Jun. 1991, pp. 219-225, Toronto, CA.

Peng, C., et al., "A New Efficient High Frequency Rectifier Circuit," Proceedings of 1991 High Frequency Power Conversion (HFPC '91) Conference, Jun. 1991, pp. 236-243, Toronto, CA.

Pietkiewicz, A., et al. "Coupled-Inductor Current-Doubler Topology in Phase-Shifted Full-Bridge DC-DC Converter," 20th International Telecommunications Energy Conference (INTELEC), Oct. 1998, pp. 41-48, IEEE, Los Alamitos, CA.

Plumton, D.L., et al., "A Low On-Resistance High-Current GaAs Power VFET," IEEE Electron Device Letters, Apr. 1995, pp. 142-144, vol. 16, No. 4, IEEE.

Rajeev, M., "An Input Current Shaper with Boost and Flyback Converter Using Integrated Magnetics," Power Electronics and Drive Systems, 5th International Conference on Power Electronics and Drive Systems 2003, Nov. 17-20, 2003, pp. 327-331, vol. 1, IEEE, Los Alamitos, CA.

Rico, M., et al., "Static and Dynamic Modeling of Tapped-Inductor DC-to-DC Converters," 1987, pp. 281-288, IEEE, Los Alamitos, CA.

Severns, R., "Circuit Reinvention in Power Electronics and Identification of Prior Work," Proceedings of 1997 IEEE Applied Power Electronics Conference (APEC '97), 1997, pp. 3-9, IEEE, Los Alamitos, CA.

Severns, R., "Circuit Reinvention in Power Electronics and Identification of Prior Work," IEEE Transactions on Power Electronics, Jan. 2001, pp. 1-7, vol. 16, No. 1, IEEE, Los Alamitos, CA.

Sun, J., et al., "Unified Analysis of Half-Bridge Converters with Current-Doubler Rectifier," Proceedings of 2001 IEEE Applied Power Electronics Conference, 2001, pp. 514-520, IEEE, Los Alamitos, CA.

Sun, J., et al., "An Improved Current-Doubler Rectifier with Integrated Magnetics," 17th Annual Applied Power Electronics Conference and Exposition (APEC), 2002, pp. 831-837, vol. 2, IEEE, Dallas, TX.

Texas Instruments Incorporated, "LT1054, LT1054Y Switched-Capacitor Voltage Converters With Regulators," SLVS033C, Feb. 1990—Revised Jul. 1998, 25 pages.

Thaker, M., et al., "Adaptive/Intelligent Control and Power Management Reduce Power Dissipation and Consumption," Digital Power Forum '06, 11 pp., Sep. 2006, Darnell Group, Richardson, TX.

Vallamkonda, S., "Limitations of Switching Voltage Regulators," A Thesis in Electrical Engineering, Texas Tech University, May 2004, 89 pages.

Wei, J., et al., "Comparison of Three Topology Candidates for 12V VRM," IEEE APEC, 2001, pp. 245-251, IEEE, Los Alamitos, CA.

Weitzel, C.E., "RF Power Devices for Wireless Communications," 2002 IEEE MTT-S CDROM, 2002, pp. 285-288, paper TU4B-1, IEEE, Los Alamitos, CA.

Williams, R., "Modern GaAs Processing Methods," 1990, pp. 66-67, Artech House, Inc., Norwood, MA.

Wong, P.-L., et al., "Investigating Coupling Inductors in the Interleaving QSW VRM," 15th Annual Applied Power Electronics Conference and Exposition (APEC 2000), Feb. 2000, pp. 973-978, vol. 2, IEEE, Los Alamitos, CA.

Xu, M., et al., "Voltage Divider and its Application in the Two-stage Power Architecture," Center for Power Electronics Systems, Virginia Polytechnic Institute and State University, IEEE, 2006, Blacksburg, Virginia, pp. 499-505.

Xu, P., et al., "Design of 48 V Voltage Regulator Modules with a Novel Integrated Magnetics," IEEE Transactions On Power Electronics, Nov. 2002, pp. 990-998, vol. 17, No. 6, IEEE, Los Alamitos, CA.

Xu, P., et al., "A Family of Novel Interleaved DC/DC Converters for Low-Voltage High-Current Voltage Regulator Module Applications," IEEE Power Electronics Specialists Conference, Jun. 2001, pp. 1507-1511, IEEE, Los Alamitos, CA.

Xu, P., et al., "A Novel Integrated Current Doubler Rectifier," IEEE 2000 Applied Power Electronics Conference, Mar. 2000, pp. 735-740, IEEE, Los Alamitos, CA.

Xu, P., et al., "Design and Performance Evaluation of Multi-Channel Interleaved Quasi-Square-Wave Buck Voltage Regulator Module," HFPC 2000 Proceedings, Oct. 2000, pp. 82-88.

Yan, L., et al., "Integrated Magnetic Full Wave Converter with Flexible Output Inductor," 17th Annual Applied Power Electronics Conference and Exposition (APEC), 2002, pp. 824-830, vol. 2, IEEE, Dallas, TX.

Yan, L., et al., "Integrated Magnetic Full Wave Converter with Flexible Output Inductor," IEEE Transactions on Power Electronics, Mar. 2003, pp. 670-678, vol. 18, No. 2, IEEE, Los Alamitos, CA.

Zhou, X., et al., "A High Power Density, High Efficiency and Fast Transient Voltage Regulator Module with a Novel Current Sensing and Current Sharing Technique," IEEE Applied Power Electronics Conference, Mar. 1999, pp. 289-294, IEEE, Los Alamitos, CA.

Zhou, X., et al., "Investigation of Candidate VRM Topologies for Future Microprocessors," IEEE Applied Power Electronics Conference, Mar. 1998, pp. 145-150, IEEE, Los Alamitos, CA.

Ridley, R., Designing with the TL431, Switching Power Magazine, Designer Series XV, pp. 1-5, 2005.

Bill Andreycak, Active Clamp and Reset Technique Enhances Forward Converter Performance, Oct. 1994, Texas Instruments, 19 pages.

\* cited by examiner

CONTROLLER FOR A POWER CONVERTER AND METHOD OF OPERATING THE SAME

TECHNICAL FIELD

The present invention is directed, in general, to power electronics and, more specifically, to a controller for a power converter and method of operating the same.

BACKGROUND

A switched-mode power converter (also referred to as a "power converter" or "regulator") is a power supply or power processing circuit that converts an input voltage waveform into a specified output voltage waveform. A power factor correction ("PFC")/resonant inductor-inductor-capacitor ("LLC") power converter includes a power train with a PFC stage followed by a LLC stage. The power converter is coupled to a source of electrical power (an alternating current ("ac") power source) and provides a direct current ("dc") output voltage. The PFC stage receives a rectified version of the ac input voltage (from the ac power source) and provides a dc bus voltage. The LLC stage employs the bus voltage to provide the dc output voltage to a load. The power converter including the PFC stage and the LLC stage can be employed to construct an "ac adapter" to provide the dc output voltage to a notebook computer or the like from the ac power source.

Controllers associated with the power converter manage an operation thereof by controlling conduction periods of power switches employed therein. Generally, the controllers are coupled between an input and output of the power converter in a feedback loop configuration (also referred to as a "control loop" or "closed control loop"). Two control processes are often employed to control the output voltage of a power converter formed with the PFC stage followed by the LLC stage. One process controls the bus voltage of the PFC stage to control the output voltage, and the other process controls the switching frequency of the LLC stage to control the output voltage. As will become more apparent, employing two independent processes to control the output voltage of the power converter with the PFC stage and the LLC stage can lead to several design issues that detract from the operation and efficiency of the power converter.

Another area of interest with respect to power converters in general is the detection and operation thereof under light load conditions. Under such conditions, it may be advantageous for the power converter to enter a burst mode of operation. Regarding the burst mode of operation, power loss of a power converter is dependent on gate drive signals for the power switches and other continuing power losses that generally do not vary substantially with the load. These power losses are commonly addressed at very low power levels by using the burst mode of operation wherein the controller is disabled for a period of time (e.g., one second) followed by a short period of high power operation (e.g., 10 milliseconds ("ms")) to provide a low average output power with low dissipation. The controller as described herein can employ the time interval of the burst mode of operation to estimate an output (or load) power of the power converter.

Accordingly, what is needed in the art is a controller that incorporates a hybrid approach to the control processes for a power converter employing different power stages in a power train thereof to avoid the deficiencies in the prior art. Additionally, what is needed in the art is a controller that can detect and manage a power converter at light loads including an operation of the power converter entering a burst mode of operation to avoid the deficiencies in the prior art.

SUMMARY OF THE INVENTION

Technical advantages are generally achieved, by advantageous embodiments of the present invention, including a controller for a power converter and method of operating the same. In one embodiment, the controller includes an inductor-inductor-capacitor ("LLC") controller configured to receive an error signal from an error amplifier to control a switching frequency of an LLC stage of the power converter to regulate an output voltage thereof. The controller also includes a power factor correction ("PFC") controller configured to control a bus voltage produced by a PFC stage of the power converter and provided to the LLC stage so that an average switching frequency thereof is substantially maintained at a desired switching frequency.

In another aspect, a burst mode controller for a power converter includes a burst mode initiate circuit configured to initiate a burst mode of operation when a signal representing an output voltage of the power converter crosses a first burst threshold level. The burst mode controller also includes a voltage elevate circuit configured to provide a voltage elevate signal to raise the output voltage if a time window expires before the signal representing the output voltage of the power converter crosses a second burst threshold level.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION OF ILLUSTRATIVE EMBODIMENTS

The making and using of the present exemplary embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely, a controller for a power converter. While the principles of the present invention will be described in the environment of a controller for a power factor correction ("PFC")/resonant inductor-inductor-capacitor ("LLC") power converter, any application that may benefit from a controller such as a power amplifier or a motor controller is well within the broad scope of the present invention.

Figure 1:
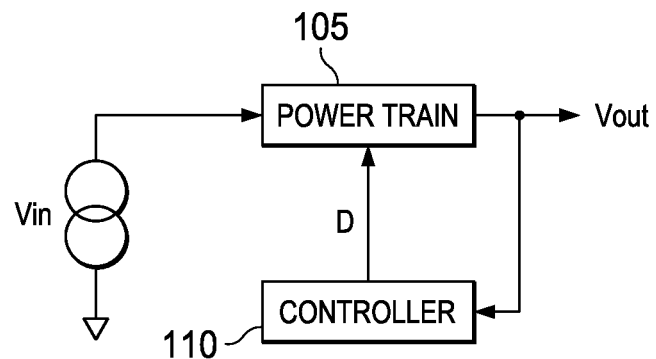
FIG. 1 illustrates a block diagram of an embodiment of a power converter including a controller constructed according to the principles of the present invention.

Referring initially to FIG. 1, illustrated is a block diagram of an embodiment of a power converter including a controller 110 constructed according to the principles of the present invention. The power converter is coupled to ac mains represented by the ac power source providing an input voltage Vin. The power converter includes a power train 105 that is controlled by the controller 110. The controller 110 generally measures an operating characteristic of the power converter such as its output voltage Vout and controls a duty cycle D of a power switch therein in response to the measured operating characteristic to regulate the characteristic. The power train 105 may include multiple power stages to provide a regulated output voltage Vout or other output characteristic to a load. The power train 105 of the power converter includes a plurality of power switches coupled to a magnetic device to provide the power conversion function.

Figure 2:
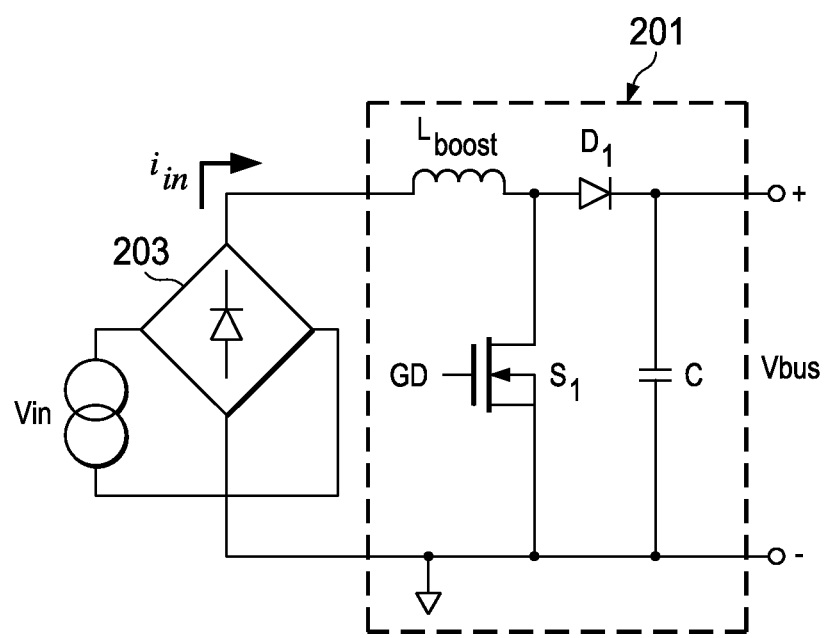
FIG. 2 illustrates a schematic diagram of a portion of power converter including an exemplary power train employing a boost topology constructed according to the principles of the present invention.

Turning now to FIG. 2, illustrated is a schematic diagram of a portion of power converter including an exemplary power train (e.g., a PFC stage 201) employing a boost topology (e.g., a PFC boost stage) constructed according to the principles of the present invention. The PFC stage 201 of the power converter receives an input voltage Vin (e.g., an unregulated ac input voltage) from a source of electrical power such as ac mains at an input thereof and provides a regulated DC bus voltage (also referred to as a bus voltage) Vbus. In keeping with the principles of a boost topology, the bus voltage Vbus is generally higher than the input voltage Vin such that a switching operation thereof can regulate the bus voltage Vbus. A main power switch $S_1$, (e.g., an n-channel metal-oxide semiconductor ("NMOS") "active" switch) is enabled to conduct by a gate drive signal GD for a primary interval and couples the input voltage Vin through a bridge rectifier 203 to a boost inductor $L_{boost}$. During a primary interval D of a switching cycle, an inductor current $i_{in}$ increases and flows through the boost inductor $L_{boost}$ to local circuit ground. The boost inductor $L_{boost}$ is generally formed with a single-layer winding to reduce the proximity effect to increase the efficiency of the power converter.

The duty cycle for the PFC stage 201 depends in steady state on the ratio of the input voltage and the bus voltage Vin, Vbus, respectively, according to the equation:

$$D = 1 - \frac{Vin}{Vbus}.$$

During a complementary interval 1-D, the main power switch $S_1$ is transitioned to a non-conducting state and an auxiliary power switch (e.g., the diode D1) conducts. In an alternative circuit arrangement, the auxiliary power switch may include a second active switch that is controlled to conduct by a complementary gate drive signal. The auxiliary power switch D1 provides a path to maintain a continuity of the inductor current $i_{in}$, flowing through the boost inductor $L_{boost}$. During the complementary interval 1-D, the inductor current $i_{in}$ flowing through the boost inductor $L_{boost}$ decreases, and may become zero and remain zero for a period of time resulting in a "discontinuous conduction mode" of operation.

During the complementary interval 1-D, the inductor current $i_{in}$ flowing through the boost inductor $L_{boost}$ flows through the diode D1 (i.e., the auxiliary power switch) into a filter capacitor C. In general, the duty cycle of the main power switch $S_1$ (and the complementary duty cycle of the auxiliary power switch D1) may be adjusted to maintain a regulation of the bus voltage Vbus of the PFC stage 201. Those skilled in the art understand that conduction periods for the main and auxiliary power switches $S_1$, D1 may be separated by a small time interval by the use of "snubber" circuit elements (not shown) or by control circuit timing to avoid cross conduction current therebetween, and beneficially to reduce the switching losses associated with the power converter. Circuit and control techniques to avoid cross-conduction currents between the main and auxiliary power switches $S_1$, D1 are well understood in the art and will not be described further in the interest of brevity. The boost inductor $L_{boost}$ is generally formed with a single-layer winding to reduce power loss associated with the proximity effect.

Figure 3:
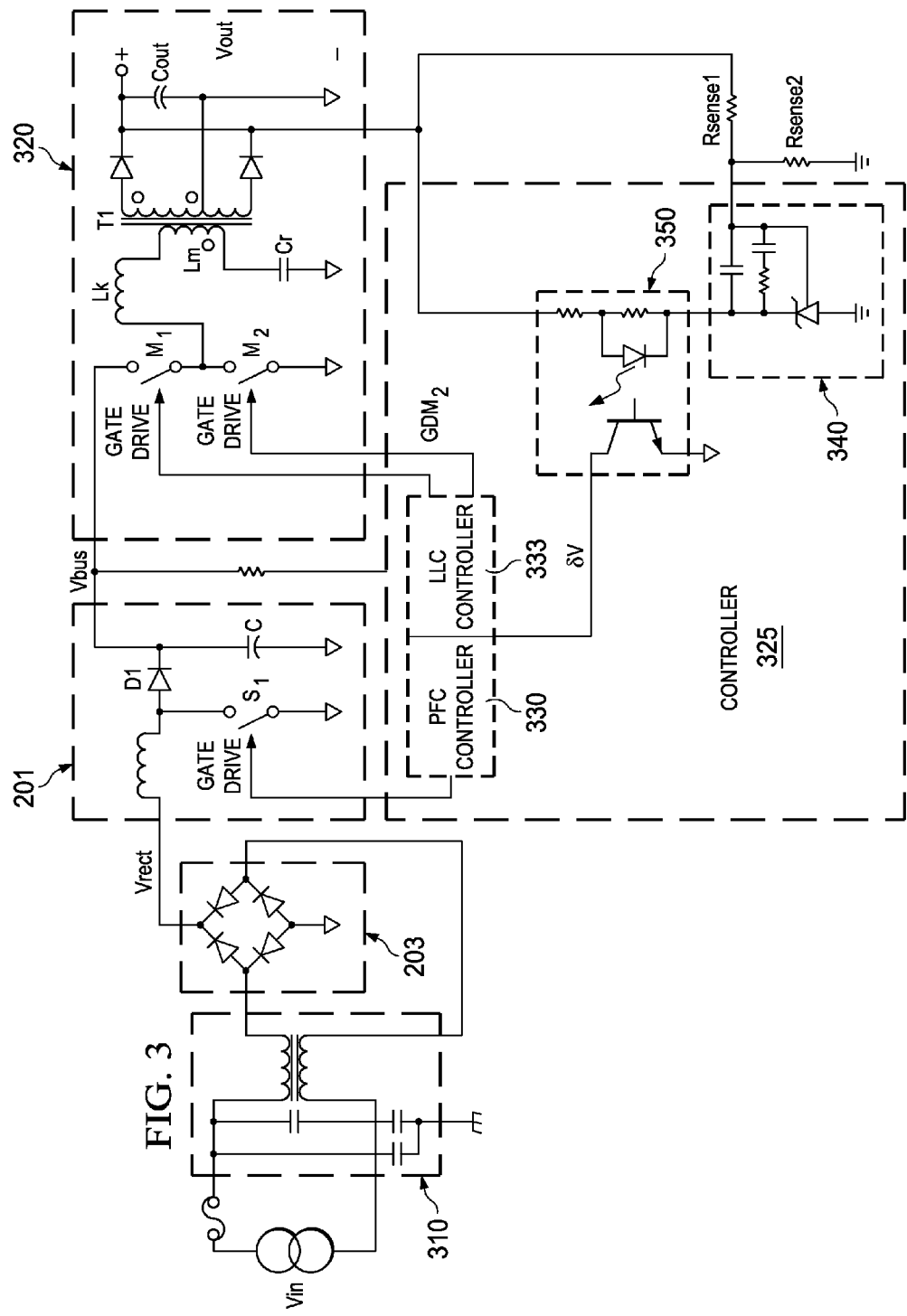
FIG. 3 illustrates a circuit diagram of an embodiment of a power converter formed with a PFC stage coupled to a LLC stage constructed according to the principles of the present invention.

Turning now to FIG. 3, illustrated is a circuit diagram of an embodiment of a power converter formed with a PFC stage (such as the PFC stage 201 of FIG. 2) coupled to a LLC stage 320 (e.g., a half-bridge LLC isolated resonant buck stage) constructed according to the principles of the present invention. The PFC stage 201 and the LLC stage 320 can be employed to construct an "ac adapter" to provide a dc output voltage Vout (e.g., 19.5 volts) to a notebook computer from an ac mains source (represented by input voltage Vin).

As mentioned above, two control processes are often employed to control the output voltage Vout of a power converter formed with a PFC stage 201 followed by the LLC stage 320. One process controls the bus voltage Vbus of the PFC stage 201 to control the output voltage Vout, and the other process controls the switching frequency (also designated switching frequency $f_s$) of the LLC stage 320 to control the output voltage Vout. The bus voltage Vbus produced by the PFC stage 201 is controlled in a slower response feedback loop in response to a load coupled to an output of the LLC stage 320. The LLC stage 320 is operated at a fixed switching frequency $f_s$ that is selected to augment the power conversion efficiency thereof. The LLC stage 320 is operated continuously in an ideal transformer state with the bus voltage Vbus produced by the PFC stage 320 controlled to compensate an IR (current times resistance) drop in the LLC stage 320. Usually the variation of the bus voltage Vbus produced by the PFC stage 201 is of the order of a few tens of volts.

Using switching frequency to control the LLC stage 320, the PFC stage 201 produces a constant dc bus voltage Vbus, but the LLC stage 320 is operated with a switching frequency that is controlled with a fast response control loop (i.e., a control loop with a high crossover frequency) in response to variations in a load coupled to an output of the power converter. Altering the switching frequency of the LLC stage 320 generally causes the LLC stage 320 to operate at a non-efficient switching frequency.

A hybrid control approach is provided wherein the bus voltage Vbus produced by the PFC stage 201 is controlled with a slower response control loop (i.e., a control loop with a low crossover frequency) to handle the average load power. The switching frequency of the LLC stage 320 is controlled with a fast response feedback loop to handle load transients and ac mains dropout events. Controlling the PFC stage 201 to control the output voltage Vout leads to several design issues. First, the bus voltage Vbus generally exhibits poor transient response due to a low PFC control-loop crossover frequency. Second, there is a substantial ripple voltage (e.g., a 100-120 hertz ripple voltage) on the bus voltage Vbus that supplies the LLC stage 320 that appears on the output thereof.

As introduced herein, the switching frequency of the LLC stage 320 is controlled with a fast response control loop to attenuate the effect of the ripple voltage produced by the PFC stage 201 that ordinarily appears on the output of the LLC stage 320. In addition, the transformer/stage gain of the LLC stage 320 is employed with a fast response control loop in a frequency region between $1/(2\pi\cdot\text{sqrt}((L_m+L_k)\cdot C_r))$ and $1/(2\pi\cdot\text{sqrt}(L_k\cdot C_r))$ to accommodate large load step changes and ac mains input voltage Vin dropout events. The bus voltage Vbus of the PFC stage 201 is controlled in response to slow changes in the load to enable the LLC stage 320 to operate ideally at or near its resonant frequency, at which point its power conversion efficiency is generally best. By operating the LLC stage 320 most of the time at or near its resonant frequency but allowing the switching frequency to change in response to transients, improved load step response, reduced output voltage Vout ripple, and higher power conversion efficiency can be obtained.

The primary inductance of the transformer T1 is the leakage inductance $L_k$ plus the magnetizing inductance $L_m$, both inductances referenced to the primary winding of the transformer T1. The resonant capacitor is $C_r$. The resonant capacitor $C_r$ can be split into two capacitors coupled in a series circuit, one end of the series circuit coupled to ground and the other end coupled to the bus voltage Vbus. A series circuit arrangement can be employed to reduce inrush current at startup. The ideal switching frequency for $f_s$ is $f_o=1/(2\pi\cdot\text{sqrt}(L_k\cdot C_r))$, which is normally the high-efficiency operating point (e.g., 50 kilohertz ("kHz")). The low switching frequency at which inefficient capacitive switching starts is $f_{min}=1/(2\cdot\text{sqrt}(L_p\cdot C_r))$. It is generally desired to operate at switching frequencies greater than the minimum switching frequency $f_{min}$, and even avoid switching frequencies that approach the same.

A controller 325 has an input for the bus voltage Vbus and an input for the output voltage Vout of the power converter from a feedback circuit including an optocoupler 350. A voltage controlled oscillator ("VCO") 336 controls the switching frequency $f_s$ of the LLC stage 320 as illustrated and described hereinbelow with reference to FIGS. 7 and 8. Thus, the PFC stage 201 and the LLC stage 320 are jointly controlled in voltage and frequency domains. As described further hereinbelow, the operation of the controller 325 is tested from time to time so that a burst mode can be entered at light loads.

As illustrated in FIG. 3, the input voltage $V_{in}$ is coupled to electromagnetic interference ("EMI") filter 310, the output of which is coupled to bridge rectifier 203 to produce a rectified voltage Vrect. The PFC stage 201 produces the bus voltage Vbus that is coupled to the input of the LLC stage 320 to produce the output voltage Vout, filtered by an output filter capacitor Cout of the power converter. In an alternative embodiment, the LLC stage 320 may be formed with a full-bridge topology. The output voltage Vout is sensed with an error amplifier 340 coupled to a resistor divider formed with first and second resistors Rsense1, Rsense2. The output signal from the error amplifier 340 is coupled to the optocoupler 350, which produces an output voltage error signal (also referred to as an "error signal") δV. The output voltage error signal δV and the bus voltage Vbus are coupled to a PFC controller 330 and/or a LLC controller 333 (hereinafter described in more detail below with respect to FIG. 7) of the controller 325. The controller 325 jointly controls the bus voltage Vbus produced by the PFC stage 201 and the switching frequency $f_s$ of the LLC stage 320 to regulate the output voltage Vout while maintaining the switching frequency $f_s$ (most of the time) at the high-efficiency operating point of the LLC stage 320.

In operation, a zero-to-full load step change in a load coupled to the output voltage Vout can, for example, cause the bus voltage Vbus to sag from 370 volts down to 290 volts due to the inherently low crossover frequency of the controller 325. By dropping the switching frequency $f_s$ of the LLC stage 320 from 50 kHz to 25 kHz with a fast response control loop, the increased voltage gain of the LLC stage 320, which can be 1.3 to 1 or higher, can be used to substantially compensate for the sag in the bus voltage Vbus. As the bus voltage Vbus recovers to about 390 volts to compensate for the IR drop in the LLC stage 320, the switching frequency $f_s$ thereof returns to 50 kHz.

The same principle can be applied to a holdup event when the ac mains voltage (the input voltage Vin) drops out. The residual energy stored in the filter capacitor C of the PFC stage 201 can be employed to maintain regulation of the output voltage Vout while the bus voltage Vbus sags from 390 volts to 280 volts. Again, the frequency-dependent voltage gain of the LLC stage 320 is used in response to a fast response control loop to regulate the output voltage Vout of the power converter. The response of the LLC stage 320 can thereby be employed to reduce the size of the filter capacitor C of the PFC stage 201 or to increase the ride-through time of the power converter for ac input voltage (the input voltage Vin) sags. Nonlinear feedback is employed for control loop compensation as described further hereinbelow.

As described in more detail below, a burst mode control signal is derived by the controller 325. When the burst mode control signal is high, the controller 325 is enabled to operate. Conversely, when the burst mode control signal is low, the controller 325 is disabled. The burst mode control signal can be used to enable a burst mode of operation for the power converter. The PFC controller 330 provides a gate drive signal for the main power switch $S_1$ of the PFC stage 201 during the primary and complementary duty cycles D, 1-D of a switching cycle and the LLC controller 333 provides gate drive signals for the main and auxiliary power switches $M_1$, $M_2$ of the LLC stage 320 during the primary and complementary intervals D, 1-D of a switching cycle. The PFC controller 330 also employs a voltage Vrect to control a low frequency current waveform from the bridge rectifier 203. A gate drive signal designated $GDM_2$ represents the gate drive signal to the auxiliary power switch $M_2$ during the complementary interval 1-D for the LLC stage 320 that will employed in the circuit illustrated in FIG. 12.

Figure 4:
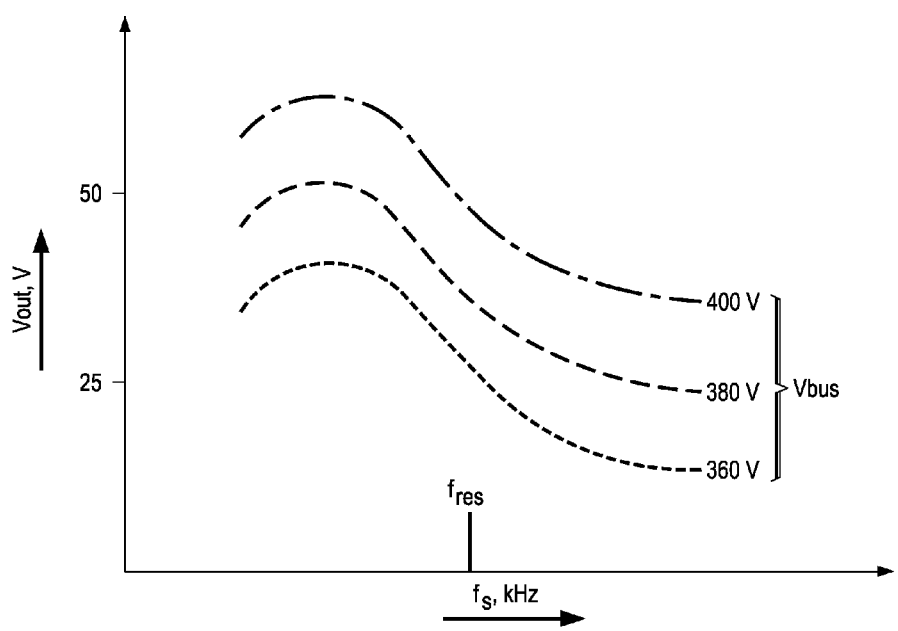
FIGS. 4-6 illustrate graphical representations of exemplary operating characteristics of a power converter according to the principles of the present invention.
Figure 5:
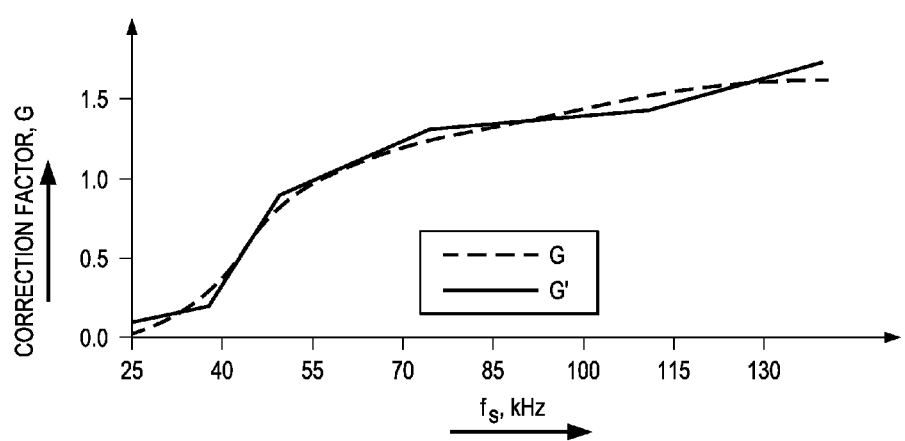
Figure 6:
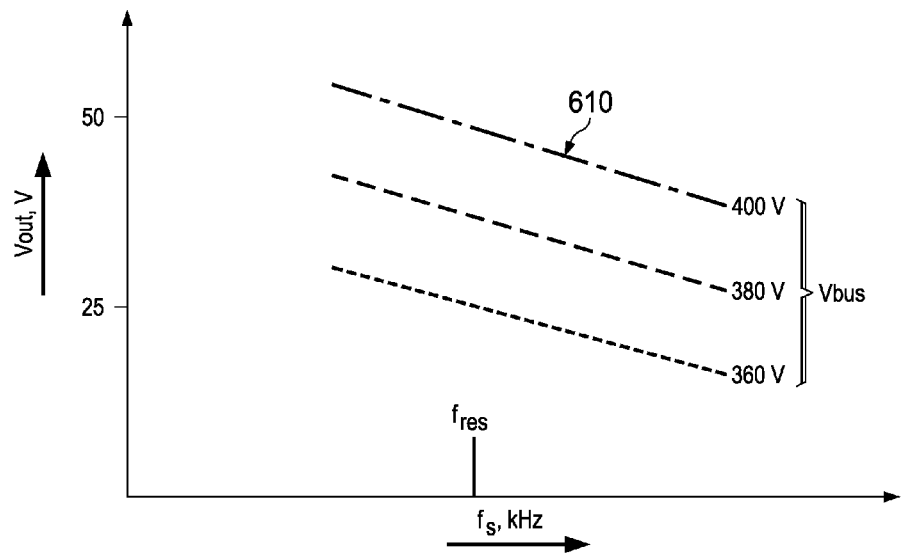

Turning now to FIGS. 4-6, illustrated are graphical representations of exemplary operating characteristics of a power converter according to the principles of the present invention. FIG. 4 illustrates a voltage transfer characteristic of an LLC stage of a power converter. The output voltage Vout of the LLC stage (and power converter) at a particular bus voltage Vbus (such as 400 volts) from a PFC stage depends in a nonlinear way on the switching frequency $f_s$ of the LLC stage. As the bus voltage Vbus is reduced, the output voltage Vout is approximately proportionately reduced if the switching frequency $f_s$ is not altered. The result is that the switching frequency $f_s$ can be varied to control the output voltage Vout as the bus voltage Vbus varies. The effect of changing the switching frequency $f_s$ on the output voltage Vout, however, is nonlinear. The resonant frequency $f_{res}$ represents the resonant frequency of the LLC stage.

Turning now to FIG. 5, illustrated is a graphical representation of a correction factor G that is an inverse function to the frequency-dependent curves illustrated in FIG. 4. A frequency-dependent curve as illustrated in FIG. 4 multiplied by the correction factor G produces straight lines for a frequency-dependent characteristic of the voltage transfer characteristic of the LLC stage. The result of multiplication by the correction factor G is illustrated in FIG. 6, such as a straight line 610 for the bus voltage Vbus equal to 400 volts. In an embodiment, the correction factor G is approximated by a broken line correction factor (such as the five-segment broken line correction factor) G' illustrated in FIG. 5.

Figure 7:
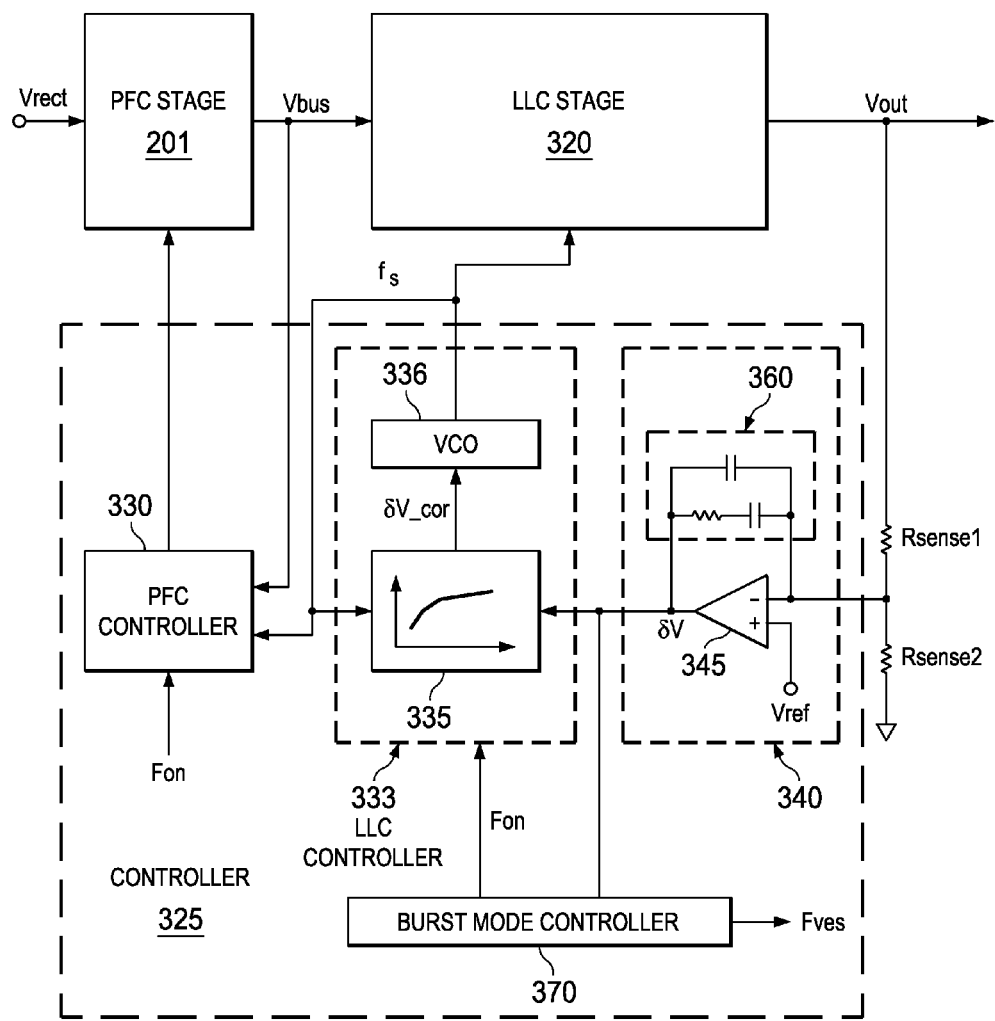
FIGS. 7 and 8 illustrate diagrams of embodiments of a power converter formed with a PFC stage coupled to a LLC stage constructed according to the principles of the present invention.

Turning now to FIG. 7, illustrated is a diagram of an embodiment of a power converter formed with a PFC stage (such as the PFC stage 201 of FIG. 2) coupled to a LLC stage (such as LLC stage 320 of FIG. 3) constructed according to the principles of the present invention. The power converter receives an input voltage and provides a rectified voltage Vrect (via a bridge rectifier), which is converted by the PFC stage 201 and LLC stage 320 into an output voltage Vout. The output voltage Vout is sensed with the resistor divider formed with first and second resistors Rsense1, Rsense2, and the sensed output voltage is coupled to an inverting input of an operational amplifier 345 of an error amplifier 340. The error amplifier 340 includes a resistor capacitor network 360 in its feedback path to produce an output voltage error signal (also referred to as an "error signal") δV.

Greater feedback loop stability is achieved by employing a nonlinear function subsystem 335 in the feedback loop to control the switching frequency $f_s$ of the LLC stage 320, to compensate for the frequency-dependent response thereof. In accordance with the nonlinear subsystem 335, a correction factor G is approximated in the form of a broken line correction factor (e.g., a five-segment broken line correction factor G'), which is applied to the output voltage error signal δV to produce a corrected error signal δV_cor. It should be understood that an optocoupler (such as optocoupler 350 illustrated in FIG. 3) may cooperate with the error amplifier 340 to produce the output voltage error signal δV. In an embodiment, a five-segment broken line correction factor G' is employed in the nonlinear function subsystem 335 to reduce nonlinear feedback effects produced by the LLC stage 320. The five-segment broken line correction factor G' may be more general referred to as a broken line correction factor. The corrected error signal δV_cor is coupled to the input of a voltage controlled oscillator ("VCO") 336 that controls the switching frequency $f_s$ of the LLC stage 320. The nonlinear function subsystem 335 and the voltage controlled oscillator 336 form at least a portion of a LLC controller 333 (see, also, FIG. 3).

The switching frequency $f_s$ is also coupled to a PFC controller 330 that produces a gate drive signal GD for the main power switch $S_1$ of the PFC stage 201 (see FIG. 3). The PFC controller 330 senses the bus voltage Vbus of the PFC stage 201. The PFC controller 330 controls the bus voltage Vbus in a slower response control loop to maintain an average value of the switching frequency $f_s$ near the ideal switching frequency $f_o = 1/(2\pi \cdot \mathrm{sqrt}(L_k \cdot C_r))$ to maintain high power conversion efficiency of the LLC stage 320.

In a further aspect, the PFC controller 330 briefly elevates the bus voltage Vbus from time to time (e.g., by 6 or 7 volts for 20 milliseconds) to generate an error in the error signal δV, or correspondingly in the corrected error signal δV_cor, to detect light-load operation so that a burst mode of operation can be entered. Burst-mode operation at light loads produces a significant improvement in power conversion efficiency in accordance with a burst mode controller 370 as described in more detail below. The bus voltage Vbus can be elevated by the PFC controller 330 by briefly elevating a reference voltage therein that is employed in conjunction with an error amplifier to regulate the bus voltage Vbus. As described hereinbelow with reference to FIG. 8, a bus voltage reference Vbus_ref coupled to an input of an error amplifier 332 is briefly elevated to enable detection of light-load operation. A burst mode is entered when the error signal δV or the corrected error signal δV_cor crosses a threshold level.

In operation at light load, the bus voltage Vbus is reduced to a low value due to reduce losses in the LLC stage 320. When the bus voltage Vbus is elevated for a short period of time, the induced change (e.g., reduction) in the error signal δV is used to determine whether to enter a burst mode. A higher bus voltage Vbus reduces the switching frequency of the LLC stage 320. A raised bus voltage Vbus and light load cause the error signal δV to go down sufficiently, which is detected to enter the burst mode. The burst mode is exited when the output voltage Vout drifts down to a threshold level, as indicated by elevation of the error signal δV. In a burst mode of operation, the switching actions of the PFC stage 201 and the LLC stage 320 are both shut down (e.g., the alternating characteristic of the duty cycle D for the gate drive signals to control the respective power switches is terminated).

Figure 8:
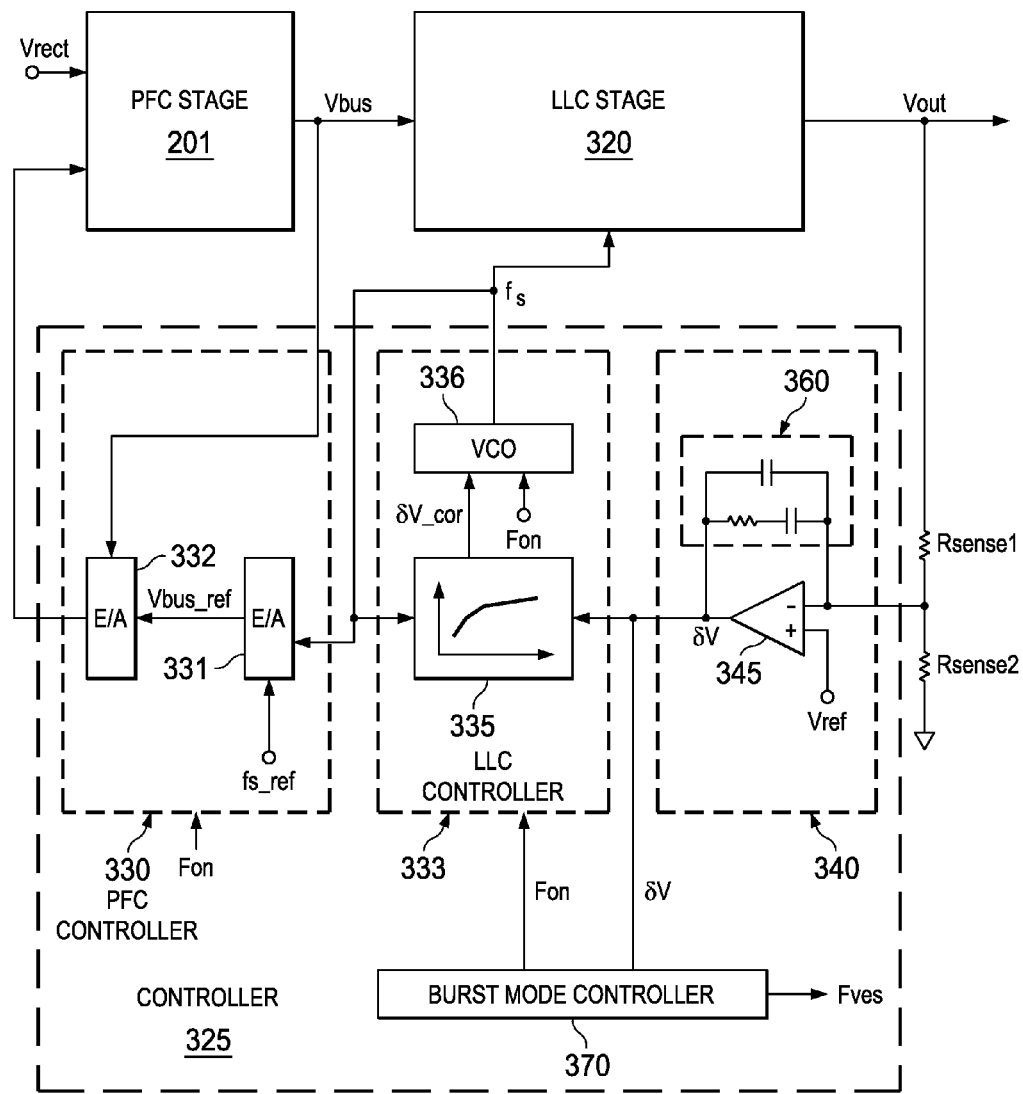

Turning now to FIG. 8, illustrated is a diagram of an embodiment of a power converter formed with a PFC stage (such as the PFC stage 201 of FIG. 2) coupled to a LLC stage (such as LLC stage 320 of FIG. 3) and a controller (including portions of the controller 325 of FIG. 7) constructed according to the principles of the present invention. The PFC controller 330 includes an error amplifier ("E/A") 331 with one input, preferably an inverting input, coupled to the switching frequency $f_s$ produced by the voltage controlled oscillator ("VCO") 336. The other input of the error amplifier 331, preferably a non-inverting input, is coupled to a frequency reference fs_ref that is a desired switching frequency for the LLC stage 320. In an embodiment, the desired switching frequency (akin to the ideal switching frequency) is $f_o = 1/(2\pi \cdot \mathrm{sqrt}(L_k \cdot C_r))$. The error amplifier 331 produces a bus voltage reference Vbus_ref that is employed by an error amplifier ("E/A") 332 in a slower response control loop to regulate the bus voltage Vbus produced by the PFC stage 201. The bus voltage reference Vbus_ref is representative of a desired voltage level for the bus voltage Vbus that provides a high power-conversion efficiency for the power converter. In this manner, the controller 325 regulates the bus voltage Vbus produced by the PFC stage 201 to produce an average switching frequency $f_s$ for the LLC stage 320 that results in a high power conversion efficiency therefor. The error amplifier 340 is retained to regulate the output voltage Vout of the power converter with a fast response control loop to enable the power converter to tightly regulate the output voltage Vout with a reduced level of ripple voltage that otherwise would be produced by a ripple voltage on the bus voltage Vbus of the PFC stage 201.

Thus a controller for a power converter has been introduced herein. In one embodiment, the controller includes a LLC controller configured to receive an error signal from an error amplifier to control a switching frequency of an LLC stage (e.g., a LLC resonant buck stage) of the power converter to regulate an output voltage thereof. The controller also includes a PFC controller configured to control a bus voltage produced by a PFC stage (e.g., a PFC boost stage) of the power converter and provided to the LLC stage so that an average switching frequency thereof is substantially maintained at a desired switching frequency (e.g., substantially equal to a resonant frequency of the LLC stage). The control loop associated with the LLC stage may have a faster response than a control loop associated with the PFC stage. The LLC controller may include a nonlinear function subsystem configured to apply a correction factor (e.g., approximated by a broken line correction factor) to the error signal to produce a corrected error signal. The LLC controller may include a voltage controlled oscillator configured to receive the corrected error signal to control the switching frequency of the LLC stage.

The PFC controller is configured to elevate the bus voltage to generate an error in the error signal to detect light-load operation of the power converter. The error amplifier is coupled to a resistor divider configured to sense the output voltage and provide a sensed output voltage to an operational amplifier of the error amplifier to produce the error signal. The PFC stage may include at least one error amplifier configured to control the bus voltage as a function of the switching frequency of the LLC stage and the desired switching frequency. The controller may also include a burst mode controller configured to cause the power converter to enter a burst mode of operation under a light load and/or when the error signal crosses a burst threshold level. The controller may also be coupled to a resistor divider configured to sense the output voltage, and first and second sense switches, coupled to the resistor divider, configured to reduce a power dissipation when the power converter enters a burst mode of operation.

Figure 9:
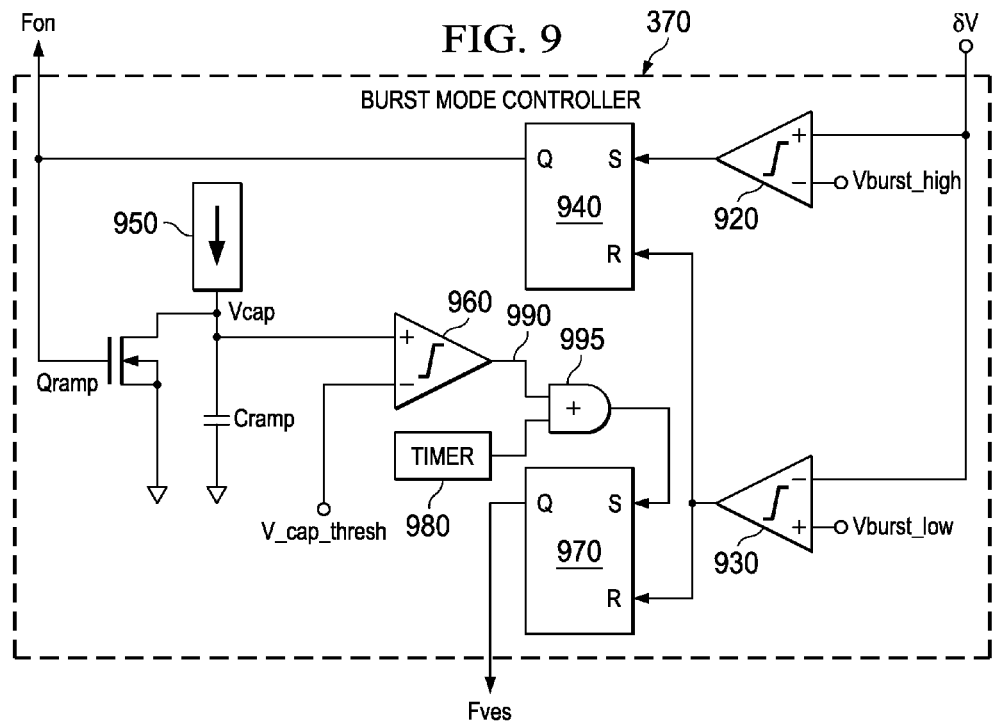
FIG. 9 illustrates a schematic drawing of an embodiment of a burst mode controller configured to manage a burst mode of operation for a power converter in accordance with the principles of the present invention.

Turning now to FIG. 9, illustrated is a schematic drawing of an embodiment of a burst mode controller (such as burst mode controller 370 of FIGS. 7 and 8) configured to manage a burst mode of operation for a power converter in accordance with the principles of the present invention. The length of the time (or time interval or window) during which operation of the controller 325 is disabled (e.g., the controller not outputting PFC stage or LLC stage gate drive signals) can be used as a reasonably accurate indicator for determining output power. The time interval can be used to determine a burst mode exit to prepare for a possible transient load step that may follow. The off time of the controller 325 is measured using a voltage produced across a ramp voltage timing capacitor Cramp.

The burst mode controller 370 is coupled to the error signal δV produced by the error amplifier 340 to set the burst mode control signal Fon and the voltage elevate signal Fves. The error signal δV is related to and provides an indicator of the output voltage Vout of the power converter. When the burst mode control signal Fon is set high, switching action of the PFC stage 201 and the LLC stage 320 of the power converter are enabled. Conversely, when the burst mode control signal Fon is low, the switching action of the PFC stage 201 and the LLC stage 320 of the power converter are disabled. The voltage elevate signal Fves is employed to briefly raise the regulated output voltage Vout of the power converter so that low load power can be detected to enable entry into a burst mode of operation.

The burst mode controller 370 is formed with a first comparator 920 with a non-inverting input coupled to the error signal δV and an inverting input coupled to a high burst threshold level Vburst_high (a second burst threshold level) and a second comparator 930 with an inverting input coupled to the error signal δV and a non-inverting input coupled to a low burst threshold level Vburst_low (a first burst threshold level). The outputs of comparators 920, 930 are coupled to ones of "set" and "reset" inputs of first and second set-reset flip-flops 940, 970. The "Q" output of the first set-reset flip-flop 940 sets the burst mode control signal Fon. The comparators 920, 930 and the first set-reset flip-flop 940 form at least a portion of a burst mode initiate circuit of the burst mode controller 370.

A current source 950 produces a current to charge the ramp voltage timing capacitor Cramp, a capacitor voltage Vcap of which is coupled to a non-inverting input of a third comparator 960. An inverting input of the third comparator 960 is coupled to capacitor voltage threshold V_cap_thresh. The burst mode control signal Fon produced by the first set-reset flip-flop 940 is also coupled to the gate of a ramp switch (e.g., an n-channel MOSFET) Qramp. When the burst mode control signal Fon is high, the ramp switch Qramp discharges ramp voltage timing capacitor Cramp. The output signal 990 of the third comparator 960 is coupled to the set input of the second set-reset flip-flop 970. The set input of second set-reset flip-flop 970 is also coupled through an AND gate 995 to a timer 980. The timer 980 periodically sets the voltage elevate signal Fves high, for example, every 40 milliseconds. When the voltage elevate signal Fves is high, the reference voltage Vref for the operational amplifier 345 of the error amplifier 340 (see FIGS. 3, 7 and 8) is raised by a small amount (e.g., by an amount sufficient to raise the output voltage Vout by a couple of volts) so that the second comparator 930 can detect a high voltage level for the output voltage Vout. The current source 950, the third comparator 960, the second set-reset flip-flop 970, the ramp voltage timing capacitor Cramp and the ramp switch Qramp form at least a portion of a voltage elevate circuit of the burst mode controller 370. As will be described in more detail below, the current source 950, the ramp voltage timing capacitor Cramp and the comparator 960 detect if the time window for the burst mode of operation expires.

The burst mode controller 370 operates with the following logic. If the error signal δV is greater than the high burst threshold level Vburst_high, then the burst mode control signal Fon is set high. The error signal δV then rises to a high level when the output voltage Vout is reduced. If the error signal δV is less than the low burst threshold level Vburst_low, then the burst mode control signal Fon is set low to enter a burst mode of operation. Conversely, the error signal δV is reduced to a low level when the output voltage Vout increases to a high level, which sets the output of the second comparator 930 high. Thus, the error signal δV provides an indicator for the output voltage Vout on the primary side of an isolation barrier (see transformer T1 of FIG. 3) that is generally formed between the primary and secondary sides of a power converter, and error signal δV accordingly controls the burst mode control signal Fon. If the error signal δV is less than the low burst threshold level Vburst_low, the voltage elevate signal Fves is also set low.

The voltage elevate signal Fves is set high if the capacitor voltage Vcap across the ramp voltage timing capacitor Cramp is greater than the capacitor voltage threshold V_cap_thresh. A high voltage across ramp voltage timing capacitor Cramp is taken as an indication of a low-power load coupled to the output of the power converter, thereby enabling entry into a burst mode of operation. The voltage elevate signal Fves is also set high in response to a signal from the timer 980, which provides a mechanism for testing the load coupled to the output of the power converter.

Figure 10:
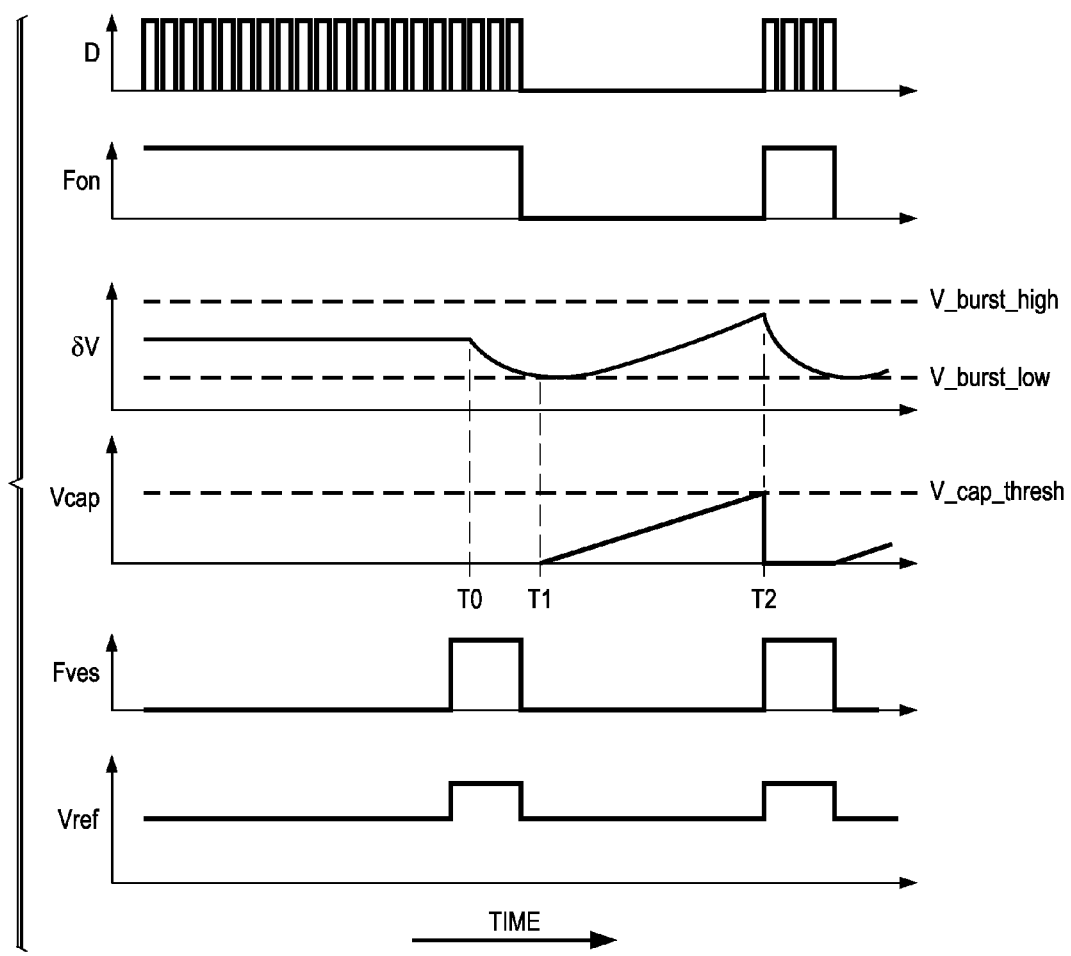
FIG. 10 illustrates a graphical representation of exemplary waveforms produced within a power converter in accordance with the principles of the present invention.

Turning now to FIG. 10, illustrated is a graphical representation of exemplary waveforms produced within a power converter in accordance with the principles of the present invention. With continuing reference to the proceeding FIGUREs, initially the power converter is assumed to be providing substantial power to a load coupled to its output, as indicated by periodic switching of the duty cycle D for the gate drive signals for the switches of the power train of the power converter. The periodic switching of the switches of the power converter is enabled by the burst mode control signal Fon. The error signal δV assumes a value between the high burst threshold level Vburst_high and the low burst threshold level Vburst_low indicating that the output voltage Vout is within an acceptable voltage regulation range. The capacitor voltage Vcap remains at zero volts because the burst mode control signal Fon is high, which turns on the ramp switch Qramp, shorting the ramp voltage timing capacitor Cramp.

Figure 11:
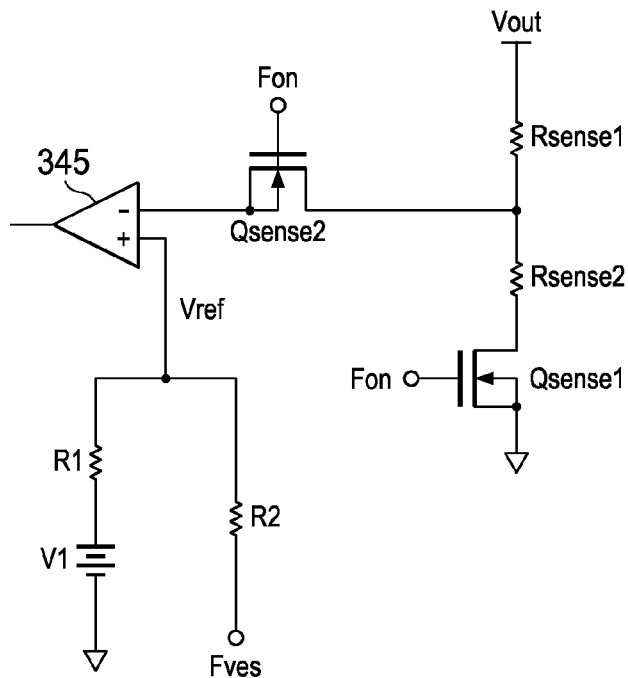
FIG. 11 illustrates a diagram of an embodiment of a resistor divider coupled to an output voltage of a power converter constructed according to the principles of the present invention.

At time T0, the timer 980 sets the output of the second set-reset flip-flop 970 high, which sets the voltage elevate signal Fves high and raises the reference voltage Vref for the operational amplifier 345 of the error amplifier 340 (see FIGS. 7, 8 and 11). The voltage elevate signal Fves initiates a test for a light load coupled to the output of the power converter. In response thereto, the output voltage Vout of the power converter is raised, which eventually reduces the error signal δV to the low burst threshold level Vburst_low at time T1. This causes the burst mode control signal Fon to be reset low (to enter the burst mode of operation), and the voltage elevate signal Fves also to be set low. The switching action of the power converter is stopped, as indicated by the absence of the duty cycle D. The capacitor voltage Vcap ramps up and, if the load on the power converter is sufficiently low, it crosses the capacitor voltage threshold V_cap_thresh at time T2, which causes the voltage elevate signal Fves and the burst mode control signal Fon to be set high. Thus, the time window for the burst mode of operation is between time T1 and time T2. Thus, the voltage elevate signal Fves is set high to raise the output voltage Vout of the power converter as the time window expires before the error signal δV crosses the high burst threshold level Vburst_high. Alternatively, the timer 980 can cause the voltage elevate signal Fves to be set high and, correspondingly, the reference voltage Vref to be elevated. Thus, the output voltage Vout of the power converter is sensed indirectly using the error signal δV and an output power of the power converter is estimated employing a slope of the output voltage Vout, which is measured by the time interval to control the burst mode operation.

An indicator of the slope of the output voltage Vout is determined by an interval of time (time window) sensed by the third comparator 960 illustrated in FIG. 9. If the capacitor voltage Vcap does not cross the capacitor voltage threshold V_cap_thresh between time T1 and time T2 (e.g., when the burst mode control signal Fon is low indicating that the output voltage Vout is within an acceptable voltage regulation range), then the slope of the output voltage Vout is sufficiently small to signal entry into a burst mode of operation. Accordingly, a load on the power converter is estimated to be less than a predetermined low threshold level. For example, if the power converter is rated to supply a 60 watt load, the predetermined low threshold level may be five watts and the burst mode controller 370 determines through the operation described above that the output power is less than five watts. In other words, the burst mode controller 370 estimates the output power in a conjunction with the slope of the output voltage Vout.

Conversely, if the capacitor voltage Vcap does cross the capacitor voltage threshold V_cap_thresh before time T2 (e.g., when the burst mode control signal Fon is low indicating that the output voltage Vout is below an acceptable voltage regulation range), then the slope of the output voltage Vout is sufficiently high to signal exit from the burst mode of operation (i.e., to enable the switching action of the power converter). Accordingly, a load on the power converter is estimated to be greater than a predetermined low threshold level. For example, if the power converter is rated to supply a 60 watt load, the predetermined low threshold level may be five watts and the burst mode controller 370 determines through the operation described above that the output power is greater than five watts. In other words, the burst mode controller 370 estimates the output power in a conjunction with the slope of the output voltage Vout.

The result is that a sufficiently high output voltage Vout sets the burst mode control signal Fon low, and a low output voltage Vout sets the burst mode control signal Fon high. The timer 980 periodically sets the voltage elevate signal Fves high, and a sufficiently high capacitor voltage Vcap produced across the ramp voltage timing capacitor Cramp also sets the voltage elevate signal Fves high. Thus, the time interval of the burst mode of operation for the power converter is employed to determine a slope of the output voltage Vout to make an estimate of the output power of the power converter. A low-power load coupled to an output of the power converter is detected to enable the power converter to enter the burst mode of operation. The capacitor voltage Vcap crossing the capacitor voltage threshold V_cap_thresh is used as an indicator of a low slope of the output voltage Vout of the power converter and, correspondingly, a low-power load.

Turning now to FIG. 11, illustrated is a diagram of an embodiment of a resistor divider formed with first and second resistors Rsense1, Rsense2 coupled to an output voltage Vout of a power converter (see, e.g., the power converters of FIGS. 3, 7 and 8) constructed according to the principles of the present invention. The resistor divider is now coupled to the non-inverting input of the operational amplifier 345 through a first sense switch (e.g., an n-channel MOSFET) Qsense2, and to ground through a second sense switch (e.g., an n-channel MOSFET) Qsense1. The burst mode control signal Fon opens the first and second sense switches Qsense1, Qsense2 to reduce power dissipation when the power converter is in a burst mode of operation as indicated by the burst mode control signal Fon being low.

The reference voltage Vref that is employed to regulate power converter output voltage Vout is coupled through a resistor R1 to a voltage source V1, and through another resistor R2 to the voltage elevate signal Fves. In this manner, the voltage elevate signal Fves elevates the reference voltage Vref when the voltage elevate signal Fves is set high.

Figure 12:
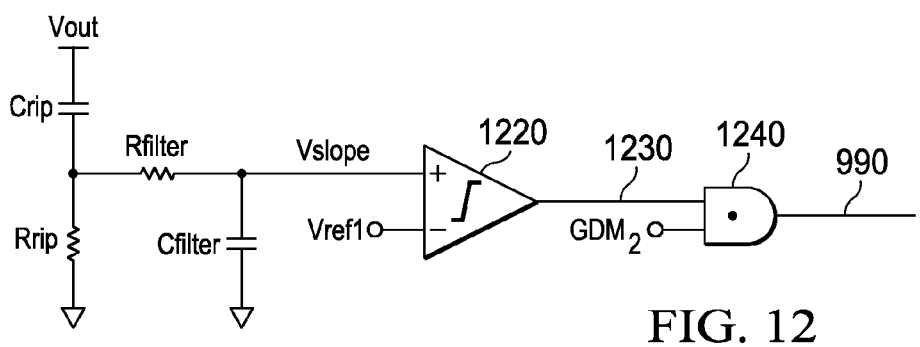
FIG. 12 illustrates a diagram of an embodiment of a portion of a voltage elevate circuit to produce a slope signal indicative of a slope of an output voltage of a power converter employable in a burst mode controller constructed according to the principles of the present invention.

Turning now to FIG. 12, illustrated is a diagram of an embodiment of a portion of a voltage elevate circuit to produce a slope signal Vslope indicative of a slope of the output voltage Vout of a power converter (see, e.g., the power converters of FIGS. 3, 7 and 8) employable in a burst mode controller 370 constructed according to the principles of the present invention. The portion of a voltage elevate circuit of FIG. 12 is an alternative to the current source 950, the third comparator 960, the ramp switch Qramp and the ramp voltage timing capacitor Cramp of the burst mode controller 370 illustrated in FIG. 9. The portion of a voltage elevate circuit of FIG. 12 senses the output voltage Vout in lieu of the error signal δV of indicated in FIG. 9. A resistor Rrip is coupled to the output voltage Vout through a capacitor Crip to sense a derivative of the output voltage Vout. The derivative is filtered with a low-pass filter formed with filter resistor Rfilter coupled to a filter capacitor Cfilter to produce a filtered slope signal Vslope. In an embodiment, a time constant of the circuit formed with the resistor Rrip coupled to the capacitor Crip is a multiple of a switching period of the power converter (e.g., 10 times the switching period). In an embodiment, a time constant of the low-pass filter formed with the filter resistor Rfilter coupled to the filter capacitor Cfilter is a submultiple of a switching period of the power converter (e.g., 0.01 times the switching period).

During a complementary interval 1-D, the slope signal Vslope can be employed to estimate an output or load power coupled to an output of the power converter. The slope signal Vslope is coupled to a non-inverting input of a comparator 1220, and an inverting input of the comparator 1220 is coupled to a slope reference voltage Vref1. The output signal 1230 of the comparator 1220 is coupled to an input of an AND gate 1240, and another input of the AND gate 1240 is coupled to the gate drive signal GDM$_2$ representing the gate drive signal to the auxiliary power switch M$_2$ during the complementary interval 1-D for the LLC stage 320 (see FIG. 3). The output of the AND gate 1240 corresponds to the output signal 990 that is employed with the second set-reset flip-flop 970 that was illustrated and described with reference to FIG. 9 to set the voltage elevate signal Fves.

A voltage slope dVout/dt of the output voltage Vout is related to the load power by the equations:

$$\frac{dVout}{dt} = \frac{-Vslope}{Rrip \cdot Crip}, \text{ and}$$

$$Pload = Iload \cdot Vout = -Vout \cdot Cout \cdot \frac{dVout}{dt} = -\frac{Vout \cdot Vslope \cdot Cout}{Rrip \cdot Crip}.$$

where Cout is output filter capacitor of the power converter as illustrated in FIG. 3.

The output signal 1230 can be employed to estimate a load power coupled to an output of the power converter and, if the load power is sufficiently light, the output signal 1230 can be employed as another mechanism to enable entry into a burst mode of operation (e.g., by setting the voltage elevate signal Fves high). The output signal 1230 can be employed with other switched-mode power converters to estimate a load power, and is not limited to enable entry of a power converter formed with a PFC stage 201 and an LLC stage 320 into a burst mode of operation.

As mentioned above with respect to the burst mode of operation, power loss of a power converter is dependent on gate drive signals for the power switches and other continuing power losses that generally do not vary substantially with the load. These power losses are commonly addressed at very low power levels by using the burst mode of operation wherein the controller (such as controller 325 of the preceding FIGUREs) is disabled for a period of time (e.g., one second) followed by a short period of high power operation (e.g., 10 milliseconds ("ms")) to provide a low average output power with low dissipation. The controller as described herein can employ the time interval of the burst mode of operation to estimate an output (or load) power of the power converter.

Thus, a burst mode controller for use with a power converter has been introduced herein. In one embodiment, the burst mode controller includes a burst mode initiate circuit configured to initiate a burst mode of operation when a signal representing an output voltage of the power converter crosses a first burst threshold level. The burst mode controller also includes a voltage elevate circuit configured to provide a voltage elevate signal to raise the output voltage if a time window expires before the signal representing the output voltage of the power converter crosses a second burst threshold level. The burst mode initiate circuit is also configured to terminate the burst mode of operation when the signal representing the output voltage of the power converter crosses the second burst threshold level.

The burst mode initiate circuit may include a comparator configured to compare the signal representing the output voltage of the power converter to the first burst threshold level. The burst mode initiate circuit may also include a flip-flop configured to set a burst mode control signal to initiate the burst mode of operation when the signal representing the output voltage of the power converter crosses the first burst threshold level. The voltage elevate circuit may include a current source, a ramp voltage timing capacitor and a comparator configured to detect if the time window expires. The voltage elevate circuit may also include a flip-flop configured to set the voltage elevate signal to raise the output voltage. The voltage elevate signal is configured to raise a reference voltage for an error amplifier configured to control the output voltage of the power converter. The burst mode initiate circuit is configured to disable the voltage elevate signal when the signal representing the output voltage of the power converter crosses the first burst threshold level. The burst mode controller may also include a timer configured to initiate (and/or periodically initiate) the voltage elevate signal to raise the output voltage.

The controller or related method may be implemented as hardware (embodied in one or more chips including an integrated circuit such as an application specific integrated circuit), or may be implemented as software or firmware for execution by a processor (e.g., a digital signal processor) in accordance with memory. In particular, in the case of firmware or software, the exemplary embodiment can be provided as a computer program product including a computer readable medium embodying computer program code (i.e., software or firmware) thereon for execution by the processor.

Program or code segments making up the various embodiments may be stored in the computer readable medium. For instance, a computer program product including a program code stored in a computer readable medium (e.g., a non-transitory computer readable medium) may form various embodiments. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, and the like.

Those skilled in the art should understand that the previously described embodiments of a power converter including a magnetics structure including U-shaped core pieces positioned on a rectilinear core piece and related methods of forming the same are submitted for illustrative purposes only. While a magnetics structure has been described in the environment of a power converter, the magnetics structure may also be applied to other systems such as, without limitation, a power amplifier and a motor controller.

For a better understanding of power converters, see "Modern DC-to-DC Power Switch-mode Power Converter Circuits," by Rudolph P. Severns and Gordon Bloom, Van Nostrand Reinhold Company, New York, N.Y. (1985) and "Principles of Power Electronics," by J. G. Kassakian, M. F. Schlecht and G. C. Verghese, Addison-Wesley (1991). The aforementioned references are incorporated herein by reference in their entirety.

Also, although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A controller for use with a power converter, comprising:
an inductor-inductor-capacitor (LLC) controller configured to receive an error signal from an error amplifier and apply a correction factor dependent on a switching frequency of an LLC stage of said power converter to produce a corrected error signal to control said switching frequency of said LLC stage to regulate an output voltage thereof; and
a power factor correction (PFC) controller also configured to regulate said output voltage by controlling a bus voltage produced by a PFC stage of said power converter and provided to said LLC stage so that an average switching frequency thereof is substantially maintained at a fixed switching frequency.

2. The controller as recited in claim 1 wherein said PFC stage is a PFC boost stage and said LLC stage is a LLC resonant buck stage.

3. The controller as recited in claim 1 wherein a control loop associated with said LLC stage has a faster response than a control loop associated with said PFC stage.

4. The controller as recited in claim 1 wherein said LLC controller comprises a nonlinear function subsystem configured to apply said correction factor to said error signal to produce said corrected error signal.

5. The controller as recited in claim 1 wherein said correction factor comprises a plurality of straight-line segments dependent on said switching frequency of said LLC stage.

6. The controller as recited in claim 1 wherein said LLC controller comprises a voltage controlled oscillator configured to receive said corrected error signal to control said switching frequency of said LLC stage.

7. The controller as recited in claim 1 wherein said PFC controller is configured to elevate said bus voltage to generate an error in said error signal to detect light-load operation of said power converter.

8. The controller as recited in claim 1 wherein said error amplifier is coupled to a resistor divider configured to sense said output voltage and provide a sensed output voltage to an operational amplifier of said error amplifier to produce said error signal.

9. The controller as recited in claim 1 wherein said PFC stage comprises at least one error amplifier configured to control said bus voltage as a function of said switching frequency of said LLC stage and said fixed switching frequency.

10. The controller as recited in claim 1 further comprising a burst mode controller configured to cause said power converter to enter a burst mode of operation under a light load.

11. The controller as recited in claim 1 further comprising a burst mode controller configured to cause said power converter to enter a burst mode of operation when said error signal crosses a burst threshold level.

12. The controller as recited in claim 1 wherein a resistor divider is configured to sense said output voltage, and first and second sense switches, coupled to said resistor divider, are configured to reduce a power dissipation when said power converter enters a burst mode of operation.

13. The controller as recited in claim 1 wherein said fixed switching frequency is substantially equal to a resonant frequency of said LLC stage.

14. A method of operating a power converter, comprising:
receiving an error signal from an error amplifier and applying a correction factor dependent on a switching frequency of an inductor-inductor-capacitor (LLC) stage of said power converter to produce a corrected error signal to control said switching frequency of said LLC stage to regulate an output voltage thereof; and
controlling a bus voltage produced by a power factor correction (PFC) stage of said power converter to further regulate said output voltage and provided to said LLC stage so that an average switching frequency thereof is substantially maintained at a fixed switching frequency.

15. The method as recited in claim 14 wherein a control loop associated with said LLC stage has a faster response than a control loop associated with said PFC stage.

16. The method as recited in claim 14 wherein said correction factor comprises a plurality of straight-line segments dependent on said switching frequency of said LLC stage.

17. The method as recited in claim 14 further comprising elevating said bus voltage to generate an error in said error signal to detect light-load operation of said power converter.

18. The method as recited in claim 14 further comprising causing said power converter to enter a burst mode of operation under a light load.

19. The method as recited in claim 14 further comprising causing said power converter to enter a burst mode of operation when said error signal crosses a burst threshold level.

20. The method as recited in claim 14 further comprising sensing said output voltage, and reducing a power dissipation when said power converter enters a burst mode of operation.

* * * * *